(12) United States Patent
Tang et al.

(10) Patent No.: US 11,743,450 B1
(45) Date of Patent: Aug. 29, 2023

(54) QUICK RGB-IR CALIBRATION VERIFICATION FOR A MASS PRODUCTION PROCESS

(71) Applicant: Ambarella International LP, Santa Clara, CA (US)

(72) Inventors: Jian Tang, Shanghai (CN); Tao Liu, Shanghai (CN); Jingyang Qiu, Shanghai (CN)

(73) Assignee: Ambarella International LP, Santa Clara, CA (US)

( * ) Notice: Subject to any disclaimer, the term of this patent is extended or adjusted under 35 U.S.C. 154(b) by 0 days.

(21) Appl. No.: 17/721,392

(22) Filed: Apr. 15, 2022

(30) Foreign Application Priority Data

Mar. 16, 2022 (CN) .......................... 202210277884.X

(51) Int. Cl.
| | | |
|---|---|---|
| *G06T 7/80* | (2017.01) | |
| *H04N 23/667* | (2023.01) | |
| *H04N 23/617* | (2023.01) | |
| *H04N 17/00* | (2006.01) | |
| *H04N 23/90* | (2023.01) | |

(52) U.S. Cl.
CPC ............. *H04N 17/002* (2013.01); *G06T 7/80* (2017.01); *H04N 23/617* (2023.01); *H04N 23/667* (2023.01); *H04N 23/90* (2023.01)

(58) Field of Classification Search
CPC .. H04N 17/002; H04N 23/617; H04N 23/667; H04N 23/90; H04N 13/246; G06T 7/80
See application file for complete search history.

(56) References Cited

U.S. PATENT DOCUMENTS

| | | | |
|---|---|---|---|
| 9,846,960 B2 * | 12/2017 | Kirk ..................... | H04N 13/239 |
| 9,894,350 B2 * | 2/2018 | Cole ....................... | G06T 15/04 |
| 10,268,885 B2 * | 4/2019 | Kang ..................... | G06F 3/0659 |
| 11,579,423 B2 * | 2/2023 | Zhu ........................ | G01J 3/14 |

* cited by examiner

*Primary Examiner* — Ahmed A Berhan
(74) *Attorney, Agent, or Firm* — Christopher P. Maiorana, PC

(57) ABSTRACT

A system comprising a plurality of capture devices and a calibration device. The capture devices may each comprise a warp table. The calibration device may be configured to store a plurality of configured warp tables in a warp table pool, perform a full calibration for one of the capture devices to generate the configured warp tables, initiate a quick calibration for the capture devices and apply one of the configured warp tables to the capture devices as the warp table. The calibration device may apply one of the configured warp tables to the capture devices by selecting one of the configured warp tables from the warp table pool in response to the quick calibration. If the quick calibration fails, the calibration device may generate a new configured warp table for the warp table pool in response to the full calibration and select the new configured warp table.

20 Claims, 11 Drawing Sheets

US 11,743,450 B1

QUICK RGB-IR CALIBRATION VERIFICATION FOR A MASS PRODUCTION PROCESS

This application relates to China Patent Application No. 202210277884.X, filed on Mar. 16, 2022, which is hereby incorporated by reference in its entirety.

FIELD OF THE INVENTION

The invention relates to camera production generally and, more particularly, to a method and/or apparatus for implementing quick RGB-IR calibration verification for a mass production process.

BACKGROUND

There has been a rapid development in machine vision, optical technology, and artificial intelligence. Three-dimensional (3D) reconstruction has become an important branch of machine vision due to advancements in robotics and deep learning technology. Generating accurate input images is important for providing reliable pixel data that may be analyzed for various post-processing techniques.

A combination of hardware and software is capable of performing various corrections on input images. However, because of differences in physical characteristics, each camera can provide various distortions to the input images. One of the physical differences between different camera devices can be caused by lens distortion. Since each lens can have different physical differences, each lens is capable of creating different physical distortions. Lens calibration is one technique that can overcome distortions to input images created by the lens.

Lens calibration is a critical process in order to have a rectified image. The accuracy of post processing steps, (i.e., object detection, face detection, face recognition, etc.) strongly depends on the perfection of the lens calibration result. However, implementing traditional dewarp methods for lens calibration are quite time-consuming. Determining a perfect warp table requires repeated calibration loops and each of the calibration loops is time-consuming. The time-consuming nature of lens calibration becomes a major problem of determining a flawless warp table and having an efficient process for sensor modules used in mass production of cameras.

Generally, traditional lens calibration requires precisely aiming a camera from a particular distance at a dot pattern board. Variables such as a rotation and movement of the camera device are indispensable for each capture of the dot pattern for calibration. Due to the precise requirements, a high-skilled person must be available to continually rotate and redirect the camera and capture the image. After capturing the dot pattern images, calibration can be performed to calculate a warp table. An evaluation of the warp table is performed and if the evaluation result is not good enough, the dot pattern images have to be re-captured and re-calculated again. The entire calibration process performed by a well-trained technician takes approximately a half an hour for each camera device module. For mass production, the calibration time will be scaled to a tremendous number.

It would be desirable to implement quick RGB-IR calibration verification for a mass production process.

SUMMARY

The invention concerns a system comprising a plurality of capture devices and a calibration device. The plurality of capture devices may each comprise a lens, a sensor and a warp table. The calibration device may be configured to store a plurality of configured warp tables in a warp table pool, perform a full calibration technique for at least one of the plurality of capture devices to generate the configured warp tables, initiate a quick calibration for the plurality of capture devices and apply one of the configured warp tables to each of the plurality of capture devices as the warp table. The calibration device may apply one of the configured warp tables to each of the plurality of capture devices by selecting one of the configured warp tables from the warp table pool in response to the quick calibration. If the quick calibration fails, the calibration device may generate a new configured warp table for the warp table pool in response to the full calibration technique and select the new configured warp table.

BRIEF DESCRIPTION OF THE FIGURES

Embodiments of the invention will be apparent from the following detailed description and the appended claims and drawings.

DETAILED DESCRIPTION OF THE EMBODIMENTS

Figure 1:
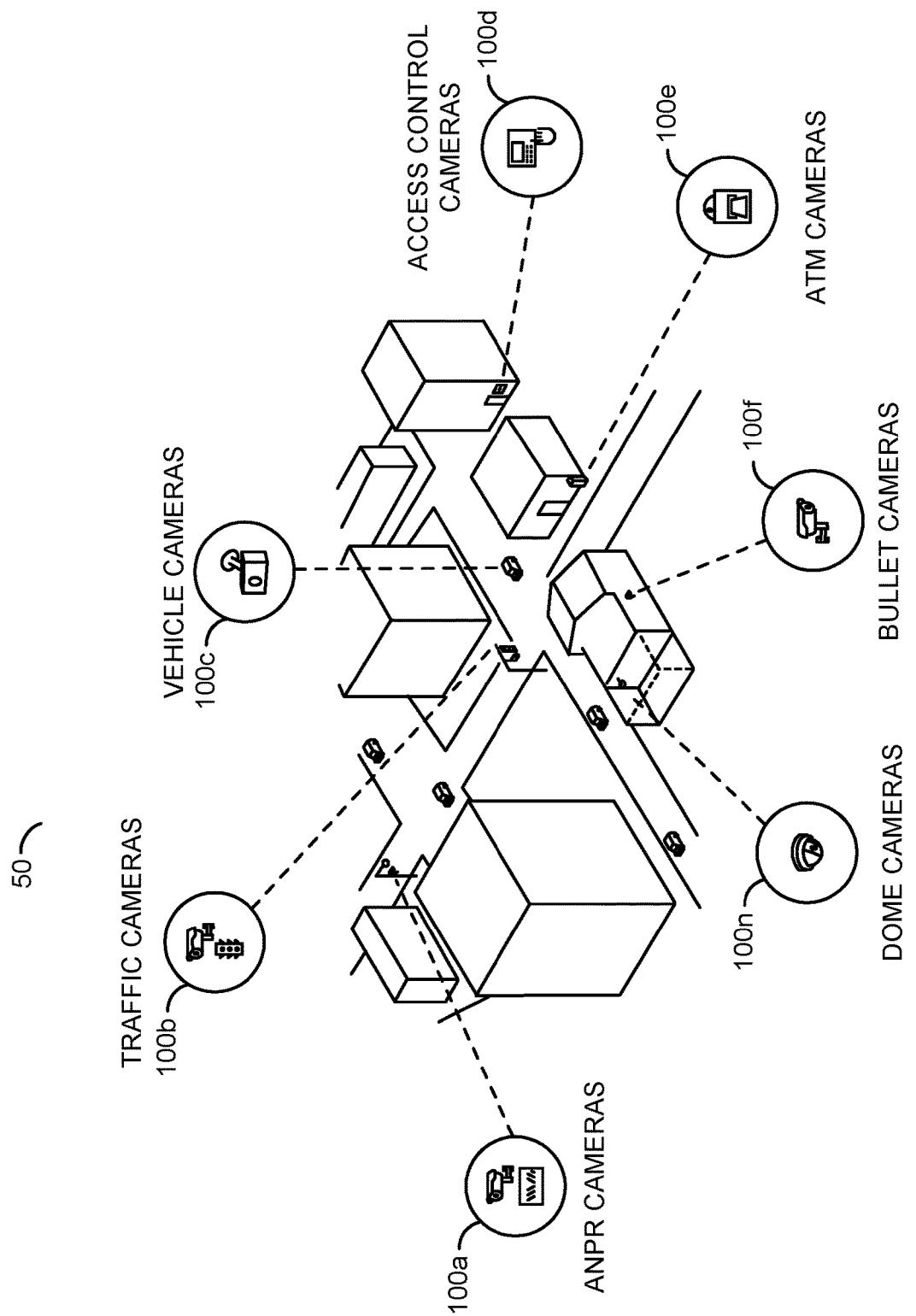
FIG. 1 is a diagram illustrating examples of edge devices that may utilize a processor configured to implement warp tables generated in accordance with example embodiments of the invention.

Embodiments of the present invention include providing quick RGB-IR calibration verification for a mass production process that may (i) provide a quick calibration that reduces an overall amount of time for lens calibration of multiple cameras, (ii) use previously calculated warp tables for cameras with similar lens characteristics, (iii) provide a warp table pool to store previously calculated warp tables, (iv) enable a full calibration technique when a suitable warp table is not available, (v) evaluate a dewarp effect for lens calibration, (vi) calculate a sum of distances between pixels to evaluate a dewarp effect for an applied warp table, (vii) perform a calibration to compensate for physical distortions caused by a camera lens, (viii) quantify a physical deviation between different sensors and/or (ix) save time and cost during a manufacture of camera devices.

Embodiments of the present invention may be configured to quickly verify an RGB-IR sensor calibration result in order to shorten the amount of time for lens calibration during mass production of camera devices. The sensor calibration may be implemented to ensure that the camera devices may be capable of providing accurate results for post-production techniques (e.g., 3D reconstruction, face ID, object detection, distance calculation, etc.). The RGB-IR sensor calibration may enable the camera devices to operate as edge devices that perform the post-processing techniques locally (e.g., without uploading data to a cloud service to rely on distributed computing power).

Embodiments of the present invention may generate a warp table pool that may be available during mass production of capture devices. For example, if all or some of the sensors produced are able to use the same warp table, time and human resources may be saved (e.g., approximately a half an hour for each camera that uses an available warp table). The sensors may have unique deviations that prevent all cameras from using the same warp table. The deviations may be caused by the lens module implemented during install and manufacture. Due to the physical differences (e.g., caused by the lens and/or other physical characteristics), each sensor produced may not be able to use the same warp table. Some sensor units may have close or exact deviations, which may be corrected using the same warp tables, and some may not.

Embodiments of the present invention may be configured to quantify a physical deviation between sensors. The quantification of the physical deviations may be performed during mass production. Sensors that have similar or the same deviations may share the same warp table directly. Generating a pool of warp tables and determining which warp tables may be applied to different devices based on similarity of deviations may save a lot of time in the mass production. For example, by sharing the same warp table, capturing dot pattern images and calculating a warp table may be skipped for some of the cameras during the calibration process. Re-using previously calculated warp tables may save physical space in a production facility and reduce an amount of human resources compared to performing a full lens calibration for each camera produced. In some embodiments, automatic devices may be implemented to place and move the dot pattern board used in calibration.

The quick verification implemented may be configured to perform sensor calibration by sorting the sensor modules based on physical deviations in order to dramatically shorten the overall calibration time. Initially, at least one of the sensors units may be calibrated using a full calibration technique. A warp table may be generated in response to the full calibration technique and stored in a warp table pool. The warp table may then be applied to a next sensor unit for quick calibration. The quick calibration may test the applied warp table. For example, the sensor unit may automatically capture an image towards a 16×9 checkerboard pattern. Then, the dewarp effect may be calculated based on the checkerboard image. If the dewarp effect is determined to be accurate (e.g., good enough), then the sensor unit may be determined to be very close in deviation characteristics to the sensor unit from which the warp table was generated. When the dewarp effect is accurate, then the sensor units may use the same warp table (e.g., share the warp table directly).

If the dewarp effect is determined to not be accurate enough, then a next warp table in the warp table pool may be tested on the sensor unit. Each warp table in the warp table pool may be tested iteratively until a warp table provides an accurate dewarp effect. If all of the warp tables in the warp table pool have been tested and do not provide the accurate dewarp effect, then no available warp tables may be shared. A new warp table may be generated. To generate the new warp table, the sensor unit may be calibrated using the full calibration technique. Each time one of the sensor units is calibrated using the full calibration technique, the newly generated warp table may be added to the warp table pool storage. The warp table pool may comprise sample warp tables from devices with unique deviation characteristics.

Embodiments of the present invention may evaluate the dewarp effect to determine whether a warp table may be shared by (e.g., applied to more than one of) the sensor units. The dewarp effect may be calibrated by calculating a straightness of the lines in a checkerboard image. After applying the warp table, the sensor unit may capture the checkerboard image. The intersection points of the checkerboard image may be fetched by an intersection detection operation. The intersection points on each of the edge lines of the checkerboard may be collected and stored. A line through the intersection points may be analyzed. The more straight the line is, the better (e.g., more accurate) the dewarp effect.

In order to calculate the straightness of the lines, a line fitting technique may be implemented. A sum of the distances from each point to the linear fitting may be calculated. The smaller the sum of the distances is, the greater the accuracy of the dewarp effect. For example, if the sum of the distances is smaller than a predetermined threshold value, then the warp table may pass the dewarp effect.

Referring to FIG. 1, a diagram illustrating examples of edge devices that may utilize a processor configured to implement warp tables generated in accordance with example embodiments of the invention is shown. An overhead view of an area 50 is shown. In the example shown, the area 50 may be an outdoor location. Streets, vehicles and buildings are shown.

Devices 100a-100n are shown at various locations in the area 50. The devices 100a-100n may each implement an edge device. The edge devices 100a-100n may comprise smart IP cameras (e.g., camera systems). The edge devices 100a-100n may comprise low power technology designed to be deployed in embedded platforms at the edge of a network (e.g., microprocessors running on sensors, cameras, or other battery-powered devices), where power consumption is a critical concern. In an example, the edge devices 100a-100n may comprise various traffic cameras and intelligent transportation systems (ITS) solutions.

The edge devices 100a-100n may be implemented for various applications. In the example shown, the edge devices 100a-100n may comprise automated number plate recognition (ANPR) cameras 100a, traffic cameras 100b, vehicle cameras 100c, access control cameras 100d, automatic teller machine (ATM) cameras 100e, bullet cameras 100f, dome cameras 100n, etc. In an example, the edge devices 100a-100n may be implemented as traffic cameras and intelligent transportation systems (ITS) solutions designed to enhance roadway security with a combination of person and vehicle detection, vehicle make/model recognition, and automatic number plate recognition (ANPR) capabilities.

In the example shown, the area 50 may be an outdoor location. In some embodiments, the edge devices 100a-100n may be implemented at various indoor locations. In an example, edge devices 100a-100n may incorporate a convolutional neural network in order to be utilized in security (surveillance) applications and/or access control applications. In an example, the edge devices 100a-100n implemented as security camera and access control applications may comprise battery-powered cameras, doorbell cameras, outdoor cameras, indoor cameras, etc. The security camera and access control applications may realize performance benefits from application of a convolutional neural network in accordance with embodiments of the invention. In an example, an edge device utilizing a convolutional neural network in accordance with an embodiment of the invention may take massive amounts of image data and make on-device inferences to obtain useful information (e.g., multiple time instances of images per network execution) with reduced bandwidth and/or reduced power consumption. The design, type and/or application performed by the edge devices 100a-100n may be varied according to the design criteria of a particular implementation.

Figure 2:
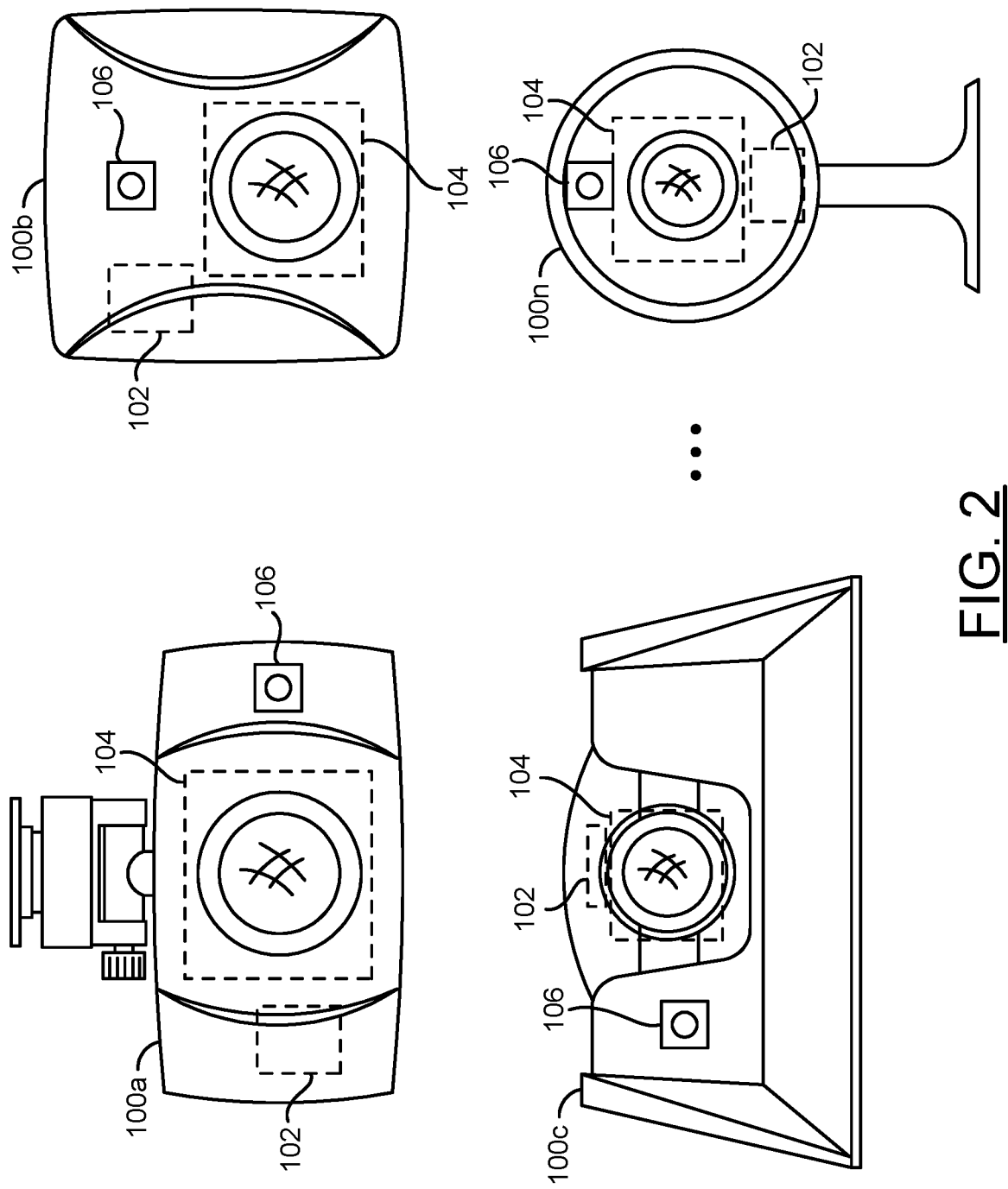
FIG. 2 is a diagram illustrating example cameras implementing an example embodiment of the present invention.

Referring to FIG. 2, a diagram illustrating example edge device cameras implementing an example embodiment of the present invention is shown. The camera systems 100a-100n are shown. Each camera device 100a-100n may have a different style and/or use case. For example, the camera 100a may be an action camera, the camera 100b may be a ceiling mounted security camera, the camera 100n may be a webcam, etc. Other types of cameras may be implemented (e.g., home security cameras, battery powered cameras, doorbell cameras, stereo cameras, etc.). The design/style of the cameras 100a-100n may be varied according to the design criteria of a particular implementation.

Each of the camera systems 100a-100n may comprise a block (or circuit) 102, a block (or circuit) 104 and/or a block (or circuit) 106. The circuit 102 may implement a processor. The circuit 104 may implement a capture device. The circuit 106 may implement a structured light projector. The camera systems 100a-100n may comprise other components (not shown). Details of the components of the cameras 100a-100n may be described in association with FIG. 3.

The processor 102 may be configured to implement an artificial neural network (ANN). In an example, the ANN may comprise a convolutional neural network (CNN). The processor 102 may be configured to implement a video encoder. The processor 102 may be configured to process the pixel data arranged as video frames. The capture device 104 may be configured to capture pixel data that may be used by the processor 102 to generate video frames. The structured light projector 106 may be configured to generate a structured light pattern (e.g., a speckle pattern). The structured light pattern may be projected onto a background (e.g., the environment). The capture device 104 may capture the pixel data comprising a background image (e.g., the environment) with the speckle pattern.

The cameras 100a-100n may be edge devices. The processor 102 implemented by each of the cameras 100a-100n may enable the cameras 100a-100n to implement various functionality internally (e.g., at a local level). For example, the processor 102 may be configured to perform object/event detection (e.g., computer vision operations), 3D reconstruction, liveness detection, depth map generation, video encoding and/or video transcoding on-device. For example, even advanced processes such as computer vision and 3D reconstruction may be performed by the processor 102 without uploading video data to a cloud service in order to offload computation-heavy functions (e.g., computer vision, video encoding, video transcoding, etc.).

In some embodiments, multiple camera systems may be implemented (e.g., camera systems 100a-100n may operate independently from each other. For example, each of the cameras 100a-100n may individually analyze the pixel data captured and perform the event/object detection locally. In some embodiments, the cameras 100a-100n may be configured as a network of cameras (e.g., security cameras that send video data to a central source such as network-attached storage and/or a cloud service). The locations and/or configurations of the cameras 100a-100n may be varied according to the design criteria of a particular implementation.

The capture device 104 of each of the camera systems 100a-100n may comprise a single lens (e.g., a monocular camera). The processor 102 may be configured to accelerate preprocessing of the speckle structured light for monocular 3D reconstruction. Monocular 3D reconstruction may be performed to generate depth images and/or disparity images without the use of stereo cameras.

Figure 3:
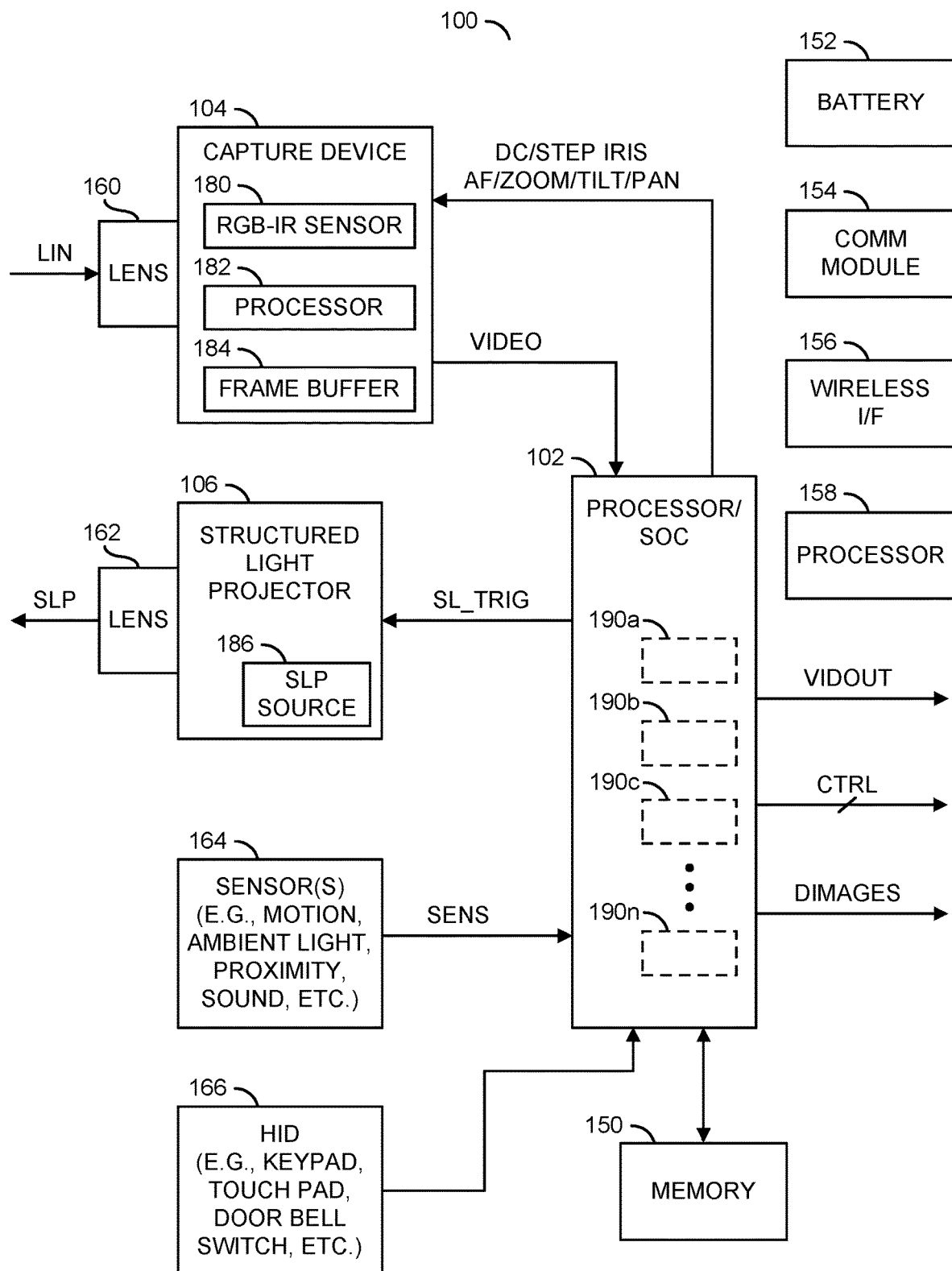
FIG. 3 is a block diagram illustrating a camera system.

Referring to FIG. 3, a block diagram of the camera system 100 is shown illustrating an example implementation. The camera system 100 may be a representative example of the cameras 100a-100n shown in association with FIG. 2. The camera system 100 may comprise the processor/SoC 102, the capture device 104, and the structured light projector 106.

The camera system 100 may further comprise a block (or circuit) 150, a block (or circuit) 152, a block (or circuit) 154, a block (or circuit) 156, a block (or circuit) 158, a block (or circuit) 160, a block (or circuit) 162, a block (or circuit) 164, and/or a block (or circuit) 166. The circuit 150 may implement a memory. The circuit 152 may implement a battery. The circuit 154 may implement a communication device. The circuit 156 may implement a wireless interface. The circuit 158 may implement a general purpose processor. The block 160 may implement an optical lens. The block 162 may implement a structured light pattern lens. The circuit 164 may implement one or more sensors. The circuit 166 may implement a human interface device (HID). In some embodiments, the camera system 100 may comprise the processor/SoC 102, the capture device 104, the IR structured light projector 106, the memory 150, the lens 160, the IR structured light projector 106, the structured light pattern lens 162, the sensors 164, the battery 152, the communication module 154, the wireless interface 156 and the processor 158. In another example, the camera system 100 may comprise processor/SoC 102, the capture device 104, the structured light projector 106, the processor 158, the lens 160, the structured light pattern lens 162, and the sensors 164 as one device, and the memory 150, the battery 152, the communication module 154, and the wireless interface 156 may be components of a separate device. The camera system 100 may comprise other components (not shown). The number, type and/or arrangement of the components of the camera system 100 may be varied according to the design criteria of a particular implementation.

The processor 102 may be implemented as a video processor. In an example, the processor 102 may be configured to receive triple-sensor video input with high-speed SLVS/MIPI-CSI/LVCMOS interfaces. In some embodiments, the processor 102 may be configured to perform depth sensing in addition to generating video frames. In an example, the depth sensing may be performed in response to depth information and/or vector light data captured in the video frames.

The memory 150 may store data. The memory 150 may implement various types of memory including, but not limited to, a cache, flash memory, memory card, random access memory (RAM), dynamic RAM (DRAM) memory, etc. The type and/or size of the memory 150 may be varied according to the design criteria of a particular implementation. The data stored in the memory 150 may correspond to a video file, motion information (e.g., readings from the sensors 164), video fusion parameters, image stabilization parameters, user inputs, computer vision models, feature sets and/or metadata information. In some embodiments, the memory 150 may store reference images. The reference images may be used for computer vision operations, 3D reconstruction, etc. In some embodiments, the reference images may comprise reference structured light images.

The processor/SoC 102 may be configured to execute computer readable code and/or process information. In various embodiments, the computer readable code may be stored within the processor/SoC 102 (e.g., microcode, etc.) and/or in the memory 150. In an example, the processor/SoC 102 may be configured to execute one or more artificial neural network models (e.g., facial recognition CNN, object detection CNN, object classification CNN, 3D reconstruction CNN, liveness detection CNN, etc.) stored in the memory 150. In an example, the memory 150 may store one or more directed acyclic graphs (DAGs) and one or more sets of weights and biases defining the one or more artificial neural network models. The processor/SoC 102 may be configured to receive input from and/or present output to the memory 150. The processor/SoC 102 may be configured to present and/or receive other signals (not shown). The number and/or types of inputs and/or outputs of the processor/SoC 102 may be varied according to the design criteria of a particular implementation. The processor/SoC 102 may be configured for low power (e.g., battery) operation.

The battery 152 may be configured to store and/or supply power for the components of the camera system 100. The dynamic driver mechanism for a rolling shutter sensor may be configured to conserve power consumption. Reducing the power consumption may enable the camera system 100 to operate using the battery 152 for extended periods of time without recharging. The battery 152 may be rechargeable. The battery 152 may be built-in (e.g., non-replaceable) or replaceable. The battery 152 may have an input for connection to an external power source (e.g., for charging). In some embodiments, the apparatus 100 may be powered by an external power supply (e.g., the battery 152 may not be implemented or may be implemented as a back-up power supply). The battery 152 may be implemented using various battery technologies and/or chemistries. The type of the battery 152 implemented may be varied according to the design criteria of a particular implementation.

The communications module 154 may be configured to implement one or more communications protocols. For example, the communications module 154 and the wireless interface 156 may be configured to implement one or more of, IEEE 102.11, IEEE 102.15, IEEE 102.15.1, IEEE 102.15.2, IEEE 102.15.3, IEEE 102.15.4, IEEE 102.15.5, IEEE 102.20, Bluetooth®, and/or ZigBee®. In some embodiments, the communication module 154 may be a hard-wired data port (e.g., a USB port, a mini-USB port, a USB-C connector, HDMI port, an Ethernet port, a DisplayPort interface, a Lightning port, etc.). In some embodiments, the wireless interface 156 may also implement one or more protocols (e.g., GSM, CDMA, GPRS, UMTS, CDMA2000, 3GPP LTE, 4G/HSPA/WiMAX, SMS, etc.) associated with cellular communication networks. In embodiments where the camera system 100 is implemented as a wireless camera, the protocol implemented by the communications module 154 and wireless interface 156 may be a wireless communications protocol. The type of communications protocols implemented by the communications module 154 may be varied according to the design criteria of a particular implementation.

The communications module 154 and/or the wireless interface 156 may be configured to generate a broadcast signal as an output from the camera system 100. The broadcast signal may send video data, disparity data and/or a control signal(s) to external devices. For example, the broadcast signal may be sent to a cloud storage service (e.g., a storage service capable of scaling on demand). In some embodiments, the communications module 154 may not transmit data until the processor/SoC 102 has performed video analytics to determine that an object is in the field of view of the camera system 100.

In some embodiments, the communications module 154 may be configured to generate a manual control signal. The manual control signal may be generated in response to a signal from a user received by the communications module 154. The manual control signal may be configured to activate the processor/SoC 102. The processor/SoC 102 may be activated in response to the manual control signal regardless of the power state of the camera system 100.

In some embodiments, the communications module 154 and/or the wireless interface 156 may be configured to receive a feature set. The feature set received may be used to detect events and/or objects. For example, the feature set may be used to perform the computer vision operations. The feature set information may comprise instructions for the processor 102 for determining which types of objects correspond to an object and/or event of interest.

In some embodiments, the communications module 154 and/or the wireless interface 156 may be configured to receive user input. The user input may enable a user to adjust operating parameters for various features implemented by the processor 102. In some embodiments, the communications module 154 and/or the wireless interface 156 may be configured to interface (e.g., using an application programming interface (API) with an application (e.g., an app). For example, the app may be implemented on a smartphone to enable an end user to adjust various settings and/or parameters for the various features implemented by the processor 102 (e.g., set video resolution, select frame rate, select output format, set tolerance parameters for 3D reconstruction, etc.).

The processor 158 may be implemented using a general purpose processor circuit. The processor 158 may be operational to interact with the video processing circuit 102 and the memory 150 to perform various processing tasks. The processor 158 may be configured to execute computer readable instructions. In one example, the computer readable instructions may be stored by the memory 150. In some embodiments, the computer readable instructions may comprise controller operations. Generally, input from the sensors 164 and/or the human interface device 166 are shown being received by the processor 102. In some embodiments, the general purpose processor 158 may be configured to receive and/or analyze data from the sensors 164 and/or the HID 166 and make decisions in response to the input. In some embodiments, the processor 158 may send data to and/or receive data from other components of the camera system 100 (e.g., the battery 152, the communication module 154 and/or the wireless interface 156). Which of the functionality of the camera system 100 is performed by the processor 102 and the general purpose processor 158 may be varied according to the design criteria of a particular implementation.

The lens 160 may be attached to the capture device 104. The capture device 104 may be configured to receive an input signal (e.g., LIN) via the lens 160. The signal LIN may be a light input (e.g., an analog image). The lens 160 may be implemented as an optical lens. The lens 160 may provide a zooming feature and/or a focusing feature. The capture device 104 and/or the lens 160 may be implemented, in one example, as a single lens assembly. In another example, the lens 160 may be a separate implementation from the capture device 104.

The capture device 104 may be configured to convert the input light LIN into computer readable data. The capture device 104 may capture data received through the lens 160 to generate raw pixel data. In some embodiments, the capture device 104 may capture data received through the lens 160 to generate bitstreams (e.g., generate video frames). For example, the capture devices 104 may receive focused light from the lens 160. The lens 160 may be directed, tilted, panned, zoomed and/or rotated to provide a targeted view from the camera system 100 (e.g., a view for a video frame, a view for a panoramic video frame captured using multiple camera systems 100a-100n, a target image and reference image view for stereo vision, etc.). The capture device 104 may generate a signal (e.g., VIDEO). The signal VIDEO may be pixel data (e.g., a sequence of pixels that may be used to generate video frames). In some embodiments, the signal VIDEO may be video data (e.g., a sequence of video frames). The signal VIDEO may be presented to one of the inputs of the processor 102. In some embodiments, the pixel data generated by the capture device 104 may be uncompressed and/or raw data generated in response to the focused light from the lens 160. In some embodiments, the output of the capture device 104 may be digital video signals.

In an example, the capture device 104 may comprise a block (or circuit) 180, a block (or circuit) 182, and a block (or circuit) 184. The circuit 180 may be an image sensor. The circuit 182 may be a processor and/or logic. The circuit 184 may be a memory circuit (e.g., a frame buffer). The lens 160 (e.g., camera lens) may be directed to provide a view of an environment surrounding the camera system 100. The lens 160 may be aimed to capture environmental data (e.g., the light input LIN). The lens 160 may be a wide-angle lens and/or fish-eye lens (e.g., lenses capable of capturing a wide field of view). The lens 160 may be configured to capture and/or focus the light for the capture device 104. Generally, the image sensor 180 is located behind the lens 160. Based on the captured light from the lens 160, the capture device 104 may generate a bitstream and/or video data (e.g., the signal VIDEO).

The capture device 104 may be configured to capture video image data (e.g., light collected and focused by the lens 160). The capture device 104 may capture data received through the lens 160 to generate a video bitstream (e.g., pixel data for a sequence of video frames). In various embodiments, the lens 160 may be implemented as a fixed focus lens. A fixed focus lens generally facilitates smaller size and low power. In an example, a fixed focus lens may be used in battery powered, doorbell, and other low power camera applications. In some embodiments, the lens 160 may be directed, tilted, panned, zoomed and/or rotated to capture the environment surrounding the camera system 100 (e.g., capture data from the field of view). In an example, professional camera models may be implemented with an active lens system for enhanced functionality, remote control, etc.

The capture device 104 may transform the received light into a digital data stream. In some embodiments, the capture device 104 may perform an analog to digital conversion. For example, the image sensor 180 may perform a photoelectric conversion of the light received by the lens 160. The processor/logic 182 may transform the digital data stream into a video data stream (or bitstream), a video file, and/or a number of video frames. In an example, the capture device 104 may present the video data as a digital video signal (e.g., VIDEO). The digital video signal may comprise the video frames (e.g., sequential digital images and/or audio). In some embodiments, the capture device 104 may comprise a microphone for capturing audio. In some embodiments, the microphone may be implemented as a separate component (e.g., one of the sensors 164).

The video data captured by the capture device 104 may be represented as a signal/bitstream/data VIDEO (e.g., a digital video signal). The capture device 104 may present the signal VIDEO to the processor/SoC 102. The signal VIDEO may represent the video frames/video data. The signal VIDEO may be a video stream captured by the capture device 104. In some embodiments, the signal VIDEO may comprise pixel data that may be operated on by the processor 102 (e.g., a video processing pipeline, an image signal processor (ISP), etc.). The processor 102 may generate the video frames in response to the pixel data in the signal VIDEO.

The signal VIDEO may comprise pixel data arranged as video frames. The signal VIDEO may be images comprising a background (e.g., objects and/or the environment captured) and the speckle pattern generated by the structured light projector 106. The signal VIDEO may comprise single-channel source images. The single-channel source images may be generated in response to capturing the pixel data using the monocular lens 160.

The image sensor 180 may receive the input light LIN from the lens 160 and transform the light LIN into digital data (e.g., the bitstream). For example, the image sensor 180 may perform a photoelectric conversion of the light from the lens 160. In some embodiments, the image sensor 180 may have extra margins that are not used as part of the image output. In some embodiments, the image sensor 180 may not have extra margins. In various embodiments, the image sensor 180 may be configured to generate an RGB-IR video signal. In an infrared light only illuminated field of view, the image sensor 180 may generate a monochrome (B/W) video signal. In a field of view illuminated by both IR light and visible light, the image sensor 180 may be configured to generate color information in addition to the monochrome video signal. In various embodiments, the image sensor 180 may be configured to generate a video signal in response to visible and/or infrared (IR) light.

In some embodiments, the camera sensor 180 may comprise a rolling shutter sensor or a global shutter sensor. In an example, the rolling shutter sensor 180 may implement an RGB-IR sensor. In some embodiments, the capture device 104 may comprise a rolling shutter IR sensor and an RGB sensor (e.g., implemented as separate components). In an example, the rolling shutter sensor 180 may be implemented as an RGB-IR rolling shutter complementary metal oxide semiconductor (CMOS) image sensor. In one example, the rolling shutter sensor 180 may be configured to assert a signal that indicates a first line exposure time. In one example, the rolling shutter sensor 180 may apply a mask to a monochrome sensor. In an example, the mask may comprise a plurality of units containing one red pixel, one green pixel, one blue pixel, and one IR pixel. The IR pixel may contain red, green, and blue filter materials that effectively absorb all of the light in the visible spectrum, while allowing the longer infrared wavelengths to pass through with minimal loss. With a rolling shutter, as each line (or row) of the sensor starts exposure, all pixels in the line (or row) may start exposure simultaneously.

The processor/logic 182 may transform the bitstream into a human viewable content (e.g., video data that may be understandable to an average person regardless of image quality, such as the video frames and/or pixel data that may be converted into video frames by the processor 102). For example, the processor/logic 182 may receive pure (e.g., raw) data from the image sensor 180 and generate (e.g., encode) video data (e.g., the bitstream) based on the raw data. The capture device 104 may have the memory 184 to store the raw data and/or the processed bitstream. For example, the capture device 104 may implement the frame memory and/or buffer 184 to store (e.g., provide temporary storage and/or cache) one or more of the video frames (e.g., the digital video signal). In some embodiments, the processor/logic 182 may perform analysis and/or correction on the video frames stored in the memory/buffer 184 of the capture device 104. The processor/logic 182 may provide status information about the captured video frames.

The structured light projector 106 may comprise a block (or circuit) 186. The circuit 186 may implement a structured light source. The structured light source 186 may be configured to generate a signal (e.g., SLP). The signal SLP may be a structured light pattern (e.g., a speckle pattern). The signal SLP may be projected onto an environment near the camera system 100. The structured light pattern SLP may be captured by the capture device 104 as part of the light input LIN.

The structured light pattern lens 162 may be a lens for the structured light projector 106. The structured light pattern lens 162 may be configured to enable the structured light SLP generated by the structured light source 186 of the structured light projector 106 to be emitted while protecting the structured light source 186. The structured light pattern lens 162 may be configured to decompose the laser light pattern generated by the structured light source 186 into a pattern array (e.g., a dense dot pattern array for a speckle pattern).

In an example, the structured light source 186 may be implemented as an array of vertical-cavity surface-emitting lasers (VCSELs) and a lens. However, other types of structured light sources may be implemented to meet design criteria of a particular application. In an example, the array of VCSELs is generally configured to generate a laser light pattern (e.g., the signal SLP). The lens is generally configured to decompose the laser light pattern to a dense dot pattern array. In an example, the structured light source 186 may implement a near infrared (NIR) light source. In various embodiments, the light source of the structured light source 186 may be configured to emit light with a wavelength of approximately 940 nanometers (nm), which is not visible to the human eye. However, other wavelengths may be utilized. In an example, a wavelength in a range of approximately 800-1000 nm may be utilized.

The sensors 164 may implement a number of sensors including, but not limited to, motion sensors, ambient light sensors, proximity sensors (e.g., ultrasound, radar, lidar, etc.), audio sensors (e.g., a microphone), etc. In embodiments implementing a motion sensor, the sensors 164 may be configured to detect motion anywhere in the field of view monitored by the camera system 100 (or in some locations outside of the field of view). In various embodiments, the detection of motion may be used as one threshold for activating the capture device 104. The sensors 164 may be implemented as an internal component of the camera system 100 and/or as a component external to the camera system 100. In an example, the sensors 164 may be implemented as a passive infrared (PIR) sensor. In another example, the sensors 164 may be implemented as a smart motion sensor. In yet another example, the sensors 164 may be implemented as a microphone. In embodiments implementing the smart motion sensor, the sensors 164 may comprise a low resolution image sensor configured to detect motion and/or persons.

In various embodiments, the sensors 164 may generate a signal (e.g., SENS). The signal SENS may comprise a variety of data (or information) collected by the sensors 164. In an example, the signal SENS may comprise data collected in response to motion being detected in the monitored field of view, an ambient light level in the monitored field of view, and/or sounds picked up in the monitored field of view. However, other types of data may be collected and/or generated based upon design criteria of a particular application. The signal SENS may be presented to the processor/SoC 102. In an example, the sensors 164 may generate (assert) the signal SENS when motion is detected in the field of view monitored by the camera system 100. In another example, the sensors 164 may generate (assert) the signal SENS when triggered by audio in the field of view monitored by the camera system 100. In still another example, the sensors 164 may be configured to provide directional information with respect to motion and/or sound detected in the field of view. The directional information may also be communicated to the processor/SoC 102 via the signal SENS.

The HID 166 may implement an input device. For example, the HID 166 may be configured to receive human input. In one example, the HID 166 may be configured to receive a password input from a user. In another example, the HID 166 may be configured to receive user input in order to provide various parameters and/or settings to the processor 102 and/or the memory 150. In some embodiments, the camera system 100 may include a keypad, a touch pad (or screen), a doorbell switch, and/or other human interface devices (HIDs) 166. In an example, the sensors 164 may be configured to determine when an object is in proximity to the HIDs 166. In an example where the camera system 100 is implemented as part of an access control application, the capture device 104 may be turned on to provide images for identifying a person attempting access, and illumination of a lock area and/or for an access touch pad 166 may be turned on. For example, a combination of input from the HIDs 166 (e.g., a password or PIN number) may be combined with the liveness judgment and/or depth analysis performed by the processor 102 to enable two-factor authentication.

The processor/SoC 102 may receive the signal VIDEO and the signal SENS. The processor/SoC 102 may generate one or more video output signals (e.g., VIDOUT), one or more control signals (e.g., CTRL) and/or one or more depth data signals (e.g., DIMAGES) based on the signal VIDEO, the signal SENS, and/or other input. In some embodiments, the signals VIDOUT, DIMAGES and CTRL may be generated based on analysis of the signal VIDEO and/or objects detected in the signal VIDEO.

In various embodiments, the processor/SoC 102 may be configured to perform one or more of feature extraction, object detection, object tracking, 3D reconstruction, liveness detection and object identification. For example, the processor/SoC 102 may determine motion information and/or depth information by analyzing a frame from the signal VIDEO and comparing the frame to a previous frame. The comparison may be used to perform digital motion estimation. In some embodiments, the processor/SoC 102 may be configured to generate the video output signal VIDOUT comprising video data and/or the depth data signal DIMAGES comprising disparity maps and depth maps from the signal VIDEO. The video output signal VIDOUT and/or the depth data signal DIMAGES may be presented to the memory 150, the communications module 154, and/or the wireless interface 156. In some embodiments, the video signal VIDOUT and/or the depth data signal DIMAGES may be used internally by the processor 102 (e.g., not presented as output).

The signal VIDOUT may be presented to the communication device 156. In some embodiments, the signal VIDOUT may comprise encoded video frames generated by the processor 102. In some embodiments, the encoded video frames may comprise a full video stream (e.g., encoded video frames representing all video captured by the capture device 104). The encoded video frames may be encoded, cropped, stitched and/or enhanced versions of the pixel data received from the signal VIDEO. In an example, the encoded video frames may be a high resolution, digital, encoded, de-warped, stabilized, cropped, blended, stitched and/or rolling shutter effect corrected version of the signal VIDEO.

In some embodiments, the signal VIDOUT may be generated based on video analytics (e.g., computer vision operations) performed by the processor 102 on the video frames generated. The processor 102 may be configured to perform the computer vision operations to detect objects and/or events in the video frames and then convert the detected objects and/or events into statistics and/or parameters. In one example, the data determined by the computer vision operations may be converted to the human-readable format by the processor 102. The data from the computer vision operations may be used to detect objects and/or events. The computer vision operations may be performed by the processor 102 locally (e.g., without communicating to an external device to offload computing operations). For example, the locally performed computer vision operations may enable the computer vision operations to be performed by the processor 102 and avoid heavy video processing running on back-end servers. Avoiding video processing running on back-end (e.g., remotely located) servers may preserve privacy.

In some embodiments, the signal VIDOUT may be data generated by the processor 102 (e.g., video analysis results, audio/speech analysis results, etc.) that may be communicated to a cloud computing service in order to aggregate information and/or provide training data for machine learning (e.g., to improve object detection, to improve audio detection, to improve liveness detection, etc.). In some embodiments, the signal VIDOUT may be provided to a cloud service for mass storage (e.g., to enable a user to retrieve the encoded video using a smartphone and/or a desktop computer). In some embodiments, the signal VIDOUT may comprise the data extracted from the video frames (e.g., the results of the computer vision), and the results may be communicated to another device (e.g., a remote server, a cloud computing system, etc.) to offload analysis of the results to another device (e.g., offload analysis of the results to a cloud computing service instead of performing all the analysis locally). The type of information communicated by the signal VIDOUT may be varied according to the design criteria of a particular implementation.

The signal CTRL may be configured to provide a control signal. The signal CTRL may be generated in response to decisions made by the processor 102. In one example, the signal CTRL may be generated in response to objects detected and/or characteristics extracted from the video frames. The signal CTRL may be configured to enable, disable, change a mode of operations of another device. In one example, a door controlled by an electronic lock may be locked/unlocked in response the signal CTRL. In another example, a device may be set to a sleep mode (e.g., a low-power mode) and/or activated from the sleep mode in response to the signal CTRL. In yet another example, an alarm and/or a notification may be generated in response to the signal CTRL. The type of device controlled by the signal CTRL, and/or a reaction performed by of the device in response to the signal CTRL may be varied according to the design criteria of a particular implementation.

The signal CTRL may be generated based on data received by the sensors 164 (e.g., a temperature reading, a motion sensor reading, etc.). The signal CTRL may be generated based on input from the HID 166. The signal CTRL may be generated based on behaviors of people detected in the video frames by the processor 102. The signal CTRL may be generated based on a type of object detected (e.g., a person, an animal, a vehicle, etc.). The signal CTRL may be generated in response to particular types of objects being detected in particular locations. The signal CTRL may be generated in response to user input in order to provide various parameters and/or settings to the processor 102 and/or the memory 150. The processor 102 may be configured to generate the signal CTRL in response to sensor fusion operations (e.g., aggregating information received from disparate sources). The processor 102 may be configured to generate the signal CTRL in response to results of liveness detection performed by the processor 102. The conditions for generating the signal CTRL may be varied according to the design criteria of a particular implementation.

The signal DIMAGES may comprise one or more of depth maps and/or disparity maps generated by the processor 102. The signal DIMAGES may be generated in response to 3D reconstruction performed on the monocular single-channel images. The signal DIMAGES may be generated in response to analysis of the captured video data and the structured light pattern SLP.

The multi-step approach to activating and/or disabling the capture device 104 based on the output of the motion sensor 164 and/or any other power consuming features of the camera system 100 may be implemented to reduce a power consumption of the camera system 100 and extend an operational lifetime of the battery 152. A motion sensor of the sensors 164 may have a low drain on the battery 152 (e.g., less than 10 W). In an example, the motion sensor of the sensors 164 may be configured to remain on (e.g., always active) unless disabled in response to feedback from the processor/SoC 102. The video analytics performed by the processor/SoC 102 may have a relatively large drain on the battery 152 (e.g., greater than the motion sensor 164). In an example, the processor/SoC 102 may be in a low-power state (or power-down) until some motion is detected by the motion sensor of the sensors 164.

The camera system 100 may be configured to operate using various power states. For example, in the power-down state (e.g., a sleep state, a low-power state) the motion sensor of the sensors 164 and the processor/SoC 102 may be on and other components of the camera system 100 (e.g., the image capture device 104, the memory 150, the communications module 154, etc.) may be off. In another example, the camera system 100 may operate in an intermediate state. In the intermediate state, the image capture device 104 may be on and the memory 150 and/or the communications module 154 may be off. In yet another example, the camera system 100 may operate in a power-on (or high power) state. In the power-on state, the sensors 164, the processor/SoC 102, the capture device 104, the memory 150, and/or the communications module 154 may be on. The camera system 100 may consume some power from the battery 152 in the power-down state (e.g., a relatively small and/or minimal amount of power). The camera system 100 may consume more power from the battery 152 in the power-on state. The number of power states and/or the components of the camera system 100 that are on while the camera system 100 operates in each of the power states may be varied according to the design criteria of a particular implementation.

In some embodiments, the camera system 100 may be implemented as a system on chip (SoC). For example, the camera system 100 may be implemented as a printed circuit board comprising one or more components. The camera system 100 may be configured to perform intelligent video analysis on the video frames of the video. The camera system 100 may be configured to crop and/or enhance the video.

In some embodiments, the video frames may be some view (or derivative of some view) captured by the capture device 104. The pixel data signals may be enhanced by the processor 102 (e.g., color conversion, noise filtering, auto exposure, auto white balance, auto focus, etc.). In some embodiments, the video frames may provide a series of cropped and/or enhanced video frames that improve upon the view from the perspective of the camera system 100 (e.g., provides night vision, provides High Dynamic Range (HDR) imaging, provides more viewing area, highlights detected objects, provides additional data such as a numerical distance to detected objects, etc.) to enable the processor 102 to see the location better than a person would be capable of with human vision.

The encoded video frames may be processed locally. In one example, the encoded, video may be stored locally by the memory 150 to enable the processor 102 to facilitate the computer vision analysis internally (e.g., without first uploading video frames to a cloud service). The processor 102 may be configured to select the video frames to be packetized as a video stream that may be transmitted over a network (e.g., a bandwidth limited network).

In some embodiments, the processor 102 may be configured to perform sensor fusion operations. The sensor fusion operations performed by the processor 102 may be configured to analyze information from multiple sources (e.g., the capture device 104, the sensors 164 and the HID 166). By analyzing various data from disparate sources, the sensor fusion operations may be capable of making inferences about the data that may not be possible from one of the data sources alone. For example, the sensor fusion operations implemented by the processor 102 may analyze video data (e.g., mouth movements of people) as well as the speech patterns from directional audio. The disparate sources may be used to develop a model of a scenario to support decision making. For example, the processor 102 may be configured to compare the synchronization of the detected speech patterns with the mouth movements in the video frames to determine which person in a video frame is speaking. The sensor fusion operations may also provide time correlation, spatial correlation and/or reliability among the data being received.

In some embodiments, the processor 102 may implement convolutional neural network capabilities. The convolutional neural network capabilities may implement computer vision using deep learning techniques. The convolutional neural network capabilities may be configured to implement pattern and/or image recognition using a training process through multiple layers of feature-detection. The computer vision and/or convolutional neural network capabilities may be performed locally by the processor 102. In some embodiments, the processor 102 may receive training data and/or feature set information from an external source. For example, an external device (e.g., a cloud service) may have access to various sources of data to use as training data that may be unavailable to the camera system 100. However, the computer vision operations performed using the feature set may be performed using the computational resources of the processor 102 within the camera system 100.

A video pipeline of the processor 102 may be configured to locally perform de-warping, cropping, enhancements, rolling shutter corrections, stabilizing, downscaling, packetizing, compression, conversion, blending, synchronizing and/or other video operations. The video pipeline of the processor 102 may enable multi-stream support (e.g., generate multiple bitstreams in parallel, each comprising a different bitrate). In an example, the video pipeline of the processor 102 may implement an image signal processor (ISP) with a 320 MPixels/s input pixel rate. The architecture of the video pipeline of the processor 102 may enable the video operations to be performed on high resolution video and/or high bitrate video data in real-time and/or near real-time. The video pipeline of the processor 102 may enable computer vision processing on 4K resolution video data, stereo vision processing, object detection, 3D noise reduction, fisheye lens correction (e.g., real time 360-degree dewarping and lens distortion correction), oversampling and/or high dynamic range processing. In one example, the architecture of the video pipeline may enable 4K ultra high resolution with H.264 encoding at double real time speed (e.g., 60 fps), 4K ultra high resolution with H.265/HEVC at 30 fps and/or 4K AVC encoding (e.g., 4KP30 AVC and HEVC encoding with multi-stream support). The type of video operations and/or the type of video data operated on by the processor 102 may be varied according to the design criteria of a particular implementation.

The camera sensor 180 may implement a high-resolution sensor. Using the high resolution sensor 180, the processor 102 may combine over-sampling of the image sensor 180 with digital zooming within a cropped area. The over-sampling and digital zooming may each be one of the video operations performed by the processor 102. The over-sampling and digital zooming may be implemented to deliver higher resolution images within the total size constraints of a cropped area.

In some embodiments, the lens 160 may implement a fisheye lens. One of the video operations implemented by the processor 102 may be a dewarping operation. The processor 102 may be configured to dewarp the video frames generated. The dewarping may be configured to reduce and/or remove acute distortion caused by the fisheye lens and/or other lens characteristics. For example, the dewarping may reduce and/or eliminate a bulging effect to provide a rectilinear image.

The processor 102 may be configured to crop (e.g., trim to) a region of interest from a full video frame (e.g., generate the region of interest video frames). The processor 102 may generate the video frames and select an area. In an example, cropping the region of interest may generate a second image. The cropped image (e.g., the region of interest video frame) may be smaller than the original video frame (e.g., the cropped image may be a portion of the captured video).

The area of interest may be dynamically adjusted based on the location of an audio source. For example, the detected audio source may be moving, and the location of the detected audio source may move as the video frames are captured. The processor 102 may update the selected region of interest coordinates and dynamically update the cropped section (e.g., directional microphones implemented as one or more of the sensors 164 may dynamically update the location based on the directional audio captured). The cropped section may correspond to the area of interest selected. As the area of interest changes, the cropped portion may change. For example, the selected coordinates for the area of interest may change from frame to frame, and the processor 102 may be configured to crop the selected region in each frame.

The processor 102 may be configured to over-sample the image sensor 180. The over-sampling of the image sensor 180 may result in a higher resolution image. The processor 102 may be configured to digitally zoom into an area of a video frame. For example, the processor 102 may digitally zoom into the cropped area of interest. For example, the processor 102 may establish the area of interest based on the directional audio, crop the area of interest, and then digitally zoom into the cropped region of interest video frame.

The dewarping operations performed by the processor 102 may adjust the visual content of the video data. The adjustments performed by the processor 102 may cause the visual content to appear natural (e.g., appear as seen by a person viewing the location corresponding to the field of view of the capture device 104). In an example, the dewarping may alter the video data to generate a rectilinear video frame (e.g., correct artifacts caused by the lens characteristics of the lens 160). The dewarping operations may be implemented to correct the distortion caused by the lens 160. The adjusted visual content may be generated to enable more accurate and/or reliable object detection.

Various features (e.g., dewarping, digitally zooming, cropping, etc.) may be implemented in the processor 102 as hardware modules. Implementing hardware modules may increase the video processing speed of the processor 102 (e.g., faster than a software implementation). The hardware implementation may enable the video to be processed while reducing an amount of delay. The hardware components used may be varied according to the design criteria of a particular implementation.

The processor 102 is shown comprising a number of blocks (or circuits) 190a-190n. The blocks 190a-190n may implement various hardware modules implemented by the processor 102. The hardware modules 190a-190n may be configured to provide various hardware components to implement a video processing pipeline. The circuits 190a-190n may be configured to receive the pixel data VIDEO, generate the video frames from the pixel data, perform various operations on the video frames (e.g., de-warping, rolling shutter correction, cropping, upscaling, image stabilization, 3D reconstruction, liveness detection, etc.), prepare the video frames for communication to external hardware (e.g., encoding, packetizing, color correcting, etc.), parse feature sets, implement various operations for computer vision (e.g., object detection, segmentation, classification, etc.), etc. The hardware modules 190a-190n may be configured to implement various security features (e.g., secure boot, I/O virtualization, etc.). Various implementations of the processor 102 may not necessarily utilize all the features of the hardware modules 190a-190n. The features and/or functionality of the hardware modules 190a-190n may be varied according to the design criteria of a particular implementation. Details of the hardware modules 190a-190n may be described in association with U.S. patent application Ser. No. 16/831,549, filed on Apr. 16, 2020, U.S. patent application Ser. No. 16/288,922, filed on Feb. 28, 2019, U.S. patent application Ser. No. 15/593,493 (now U.S. Pat. No. 10,437,600), filed on May 12, 2017, U.S. patent application Ser. No. 15/931,942, filed on May 14, 2020, U.S. patent application Ser. No. 16/991,344, filed on Aug. 12, 2020, U.S. patent application Ser. No. 17/479,034, filed on Sep. 20, 2021, appropriate portions of which are hereby incorporated by reference in their entirety.

The hardware modules 190a-190n may be implemented as dedicated hardware modules. Implementing various functionality of the processor 102 using the dedicated hardware modules 190a-190n may enable the processor 102 to be highly optimized and/or customized to limit power consumption, reduce heat generation and/or increase processing speed compared to software implementations. The hardware modules 190a-190n may be customizable and/or programmable to implement multiple types of operations. Implementing the dedicated hardware modules 190a-190n may enable the hardware used to perform each type of calculation to be optimized for speed and/or efficiency. For example, the hardware modules 190a-190n may implement a number of relatively simple operations that are used frequently in computer vision operations that, together, may enable the computer vision operations to be performed in real-time. The video pipeline may be configured to recognize objects. Objects may be recognized by interpreting numerical and/or symbolic information to determine that the visual data represents a particular type of object and/or feature. For example, the number of pixels and/or the colors of the pixels of the video data may be used to recognize portions of the video data as objects. The hardware modules 190a-190n may enable computationally intensive operations (e.g., computer vision operations, video encoding, video transcoding, 3D reconstruction, depth map generation, liveness detection, etc.) to be performed locally by the camera system 100.

One of the hardware modules 190a-190n (e.g., 190a) may implement a scheduler circuit. The scheduler circuit 190a may be configured to store a directed acyclic graph (DAG). In an example, the scheduler circuit 190a may be configured to generate and store the directed acyclic graph in response to the feature set information received (e.g., loaded). The directed acyclic graph may define the video operations to perform for extracting the data from the video frames. For example, the directed acyclic graph may define various mathematical weighting (e.g., neural network weights and/or biases) to apply when performing computer vision operations to classify various groups of pixels as particular objects.

The scheduler circuit 190a may be configured to parse the acyclic graph to generate various operators. The operators may be scheduled by the scheduler circuit 190a in one or more of the other hardware modules 190a-190n. For example, one or more of the hardware modules 190a-190n may implement hardware engines configured to perform specific tasks (e.g., hardware engines designed to perform particular mathematical operations that are repeatedly used to perform computer vision operations). The scheduler circuit 190a may schedule the operators based on when the operators may be ready to be processed by the hardware engines 190a-190n.

The scheduler circuit 190a may time multiplex the tasks to the hardware modules 190a-190n based on the availability of the hardware modules 190a-190n to perform the work. The scheduler circuit 190a may parse the directed acyclic graph into one or more data flows. Each data flow may include one or more operators. Once the directed acyclic graph is parsed, the scheduler circuit 190a may allocate the data flows/operators to the hardware engines 190a-190n and send the relevant operator configuration information to start the operators.

Each directed acyclic graph binary representation may be an ordered traversal of a directed acyclic graph with descriptors and operators interleaved based on data dependencies. The descriptors generally provide registers that link data buffers to specific operands in dependent operators. In various embodiments, an operator may not appear in the directed acyclic graph representation until all dependent descriptors are declared for the operands.

One of the hardware modules 190a-190n (e.g., 190b) may implement an artificial neural network (ANN) module. The artificial neural network module may be implemented as a fully connected neural network or a convolutional neural network (CNN). In an example, fully connected networks are "structure agnostic" in that there are no special assumptions that need to be made about an input. A fully-connected neural network comprises a series of fully-connected layers that connect every neuron in one layer to every neuron in the other layer. In a fully-connected layer, for n inputs and m outputs, there are n*m weights. There is also a bias value for each output node, resulting in a total of (n+1)*m parameters. In an already-trained neural network, the (n+1)*m parameters have already been determined during a training process. An already-trained neural network generally comprises an architecture specification and the set of parameters (weights and biases) determined during the training process. In another example, CNN architectures may make explicit assumptions that the inputs are images to enable encoding particular properties into a model architecture. The CNN architecture may comprise a sequence of layers with each layer transforming one volume of activations to another through a differentiable function.

In the example shown, the artificial neural network 190b may implement a convolutional neural network (CNN) module. The CNN module 190b may be configured to perform the computer vision operations on the video frames. The CNN module 190b may be configured to implement recognition of objects through multiple layers of feature detection. The CNN module 190b may be configured to calculate descriptors based on the feature detection performed. The descriptors may enable the processor 102 to determine a likelihood that pixels of the video frames correspond to particular objects (e.g., a particular make/model/year of a vehicle, identifying a person as a particular individual, detecting a type of animal, detecting characteristics of a face, etc.).

The CNN module 190b may be configured to implement convolutional neural network capabilities. The CNN module 190b may be configured to implement computer vision using deep learning techniques. The CNN module 190b may be configured to implement pattern and/or image recognition using a training process through multiple layers of feature-detection. The CNN module 190b may be configured to conduct inferences against a machine learning model.

The CNN module 190b may be configured to perform feature extraction and/or matching solely in hardware. Feature points typically represent interesting areas in the video frames (e.g., corners, edges, etc.). By tracking the feature points temporally, an estimate of ego-motion of the capturing platform or a motion model of observed objects in the scene may be generated. In order to track the feature points, a matching operation is generally incorporated by hardware in the CNN module 190b to find the most probable correspondences between feature points in a reference video frame and a target video frame. In a process to match pairs of reference and target feature points, each feature point may be represented by a descriptor (e.g., image patch, SIFT, BRIEF, ORB, FREAK, etc.). Implementing the CNN module 190b using dedicated hardware circuitry may enable calculating descriptor matching distances in real time.

The CNN module 190b may be configured to perform face detection, face recognition and/or liveness judgment. For example, face detection, face recognition and/or liveness judgment may be performed based on a trained neural network implemented by the CNN module 190b. In some embodiments, the CNN module 190b may be configured to generate the depth image from the structured light pattern. The CNN module 190b may be configured to perform various detection and/or recognition operations and/or perform 3D recognition operations.

The CNN module 190b may be a dedicated hardware module configured to perform feature detection of the video frames. The features detected by the CNN module 190b may be used to calculate descriptors. The CNN module 190b may determine a likelihood that pixels in the video frames belong to a particular object and/or objects in response to the descriptors. For example, using the descriptors, the CNN module 190b may determine a likelihood that pixels correspond to a particular object (e.g., a person, an item of furniture, a pet, a vehicle, etc.) and/or characteristics of the object (e.g., shape of eyes, distance between facial features, a hood of a vehicle, a body part, a license plate of a vehicle, a face of a person, clothing worn by a person, etc.). Implementing the CNN module 190b as a dedicated hardware module of the processor 102 may enable the apparatus 100 to perform the computer vision operations locally (e.g., on-chip) without relying on processing capabilities of a remote device (e.g., communicating data to a cloud computing service).

The computer vision operations performed by the CNN module 190b may be configured to perform the feature detection on the video frames in order to generate the descriptors. The CNN module 190b may perform the object detection to determine regions of the video frame that have a high likelihood of matching the particular object. In one example, the types of object(s) to match against (e.g., reference objects) may be customized using an open operand stack (enabling programmability of the processor 102 to implement various artificial neural networks defined by directed acyclic graphs each providing instructions for performing various types of object detection). The CNN module 190b may be configured to perform local masking to the region with the high likelihood of matching the particular object(s) to detect the object.

In some embodiments, the CNN module 190b may determine the position (e.g., 3D coordinates and/or location coordinates) of various features (e.g., the characteristics) of the detected objects. In one example, the location of the arms, legs, chest and/or eyes of a person may be determined using 3D coordinates. One location coordinate on a first axis for a vertical location of the body part in 3D space and another coordinate on a second axis for a horizontal location of the body part in 3D space may be stored. In some embodiments, the distance from the lens 160 may represent one coordinate (e.g., a location coordinate on a third axis) for a depth location of the body part in 3D space. Using the location of various body parts in 3D space, the processor 102 may determine body position, and/or body characteristics of detected people.

The CNN module 190b may be pre-trained (e.g., configured to perform computer vision to detect objects based on the training data received to train the CNN module 190b). For example, the results of training data (e.g., a machine learning model) may be pre-programmed and/or loaded into the processor 102. The CNN module 190b may conduct inferences against the machine learning model (e.g., to perform object detection). The training may comprise determining weight values for each layer of the neural network model. For example, weight values may be determined for each of the layers for feature extraction (e.g., a convolutional layer) and/or for classification (e.g., a fully connected layer). The weight values learned by the CNN module 190b may be varied according to the design criteria of a particular implementation.

The CNN module 190b may implement the feature extraction and/or object detection by performing convolution operations. The convolution operations may be hardware accelerated for fast (e.g., real-time) calculations that may be performed while consuming low power. In some embodiments, the convolution operations performed by the CNN module 190b may be utilized for performing the computer vision operations. In some embodiments, the convolution operations performed by the CNN module 190b may be utilized for any functions performed by the processor 102 that may involve calculating convolution operations (e.g., 3D reconstruction).

The convolution operation may comprise sliding a feature detection window along the layers while performing calculations (e.g., matrix operations). The feature detection window may apply a filter to pixels and/or extract features associated with each layer. The feature detection window may be applied to a pixel and a number of surrounding pixels. In an example, the layers may be represented as a matrix of values representing pixels and/or features of one of the layers and the filter applied by the feature detection window may be represented as a matrix. The convolution operation may apply a matrix multiplication between the region of the current layer covered by the feature detection window. The convolution operation may slide the feature detection window along regions of the layers to generate a result representing each region. The size of the region, the type of operations applied by the filters and/or the number of layers may be varied according to the design criteria of a particular implementation.

Using the convolution operations, the CNN module 190b may compute multiple features for pixels of an input image in each extraction step. For example, each of the layers may receive inputs from a set of features located in a small neighborhood (e.g., region) of the previous layer (e.g., a local receptive field). The convolution operations may extract elementary visual features (e.g., such as oriented edges, end-points, corners, etc.), which are then combined by higher layers. Since the feature extraction window operates on a pixel and nearby pixels (or sub-pixels), the results of the operation may have location invariance. The layers may comprise convolution layers, pooling layers, non-linear layers and/or fully connected layers. In an example, the convolution operations may learn to detect edges from raw pixels (e.g., a first layer), then use the feature from the previous layer (e.g., the detected edges) to detect shapes in a next layer and then use the shapes to detect higher-level features (e.g., facial features, pets, vehicles, components of a vehicle, furniture, etc.) in higher layers and the last layer may be a classifier that uses the higher level features.

The CNN module 190b may execute a data flow directed to feature extraction and matching, including two-stage detection, a warping operator, component operators that manipulate lists of components (e.g., components may be regions of a vector that share a common attribute and may be grouped together with a bounding box), a matrix inversion operator, a dot product operator, a convolution operator, conditional operators (e.g., multiplex and demultiplex), a remapping operator, a minimum-maximum-reduction operator, a pooling operator, a non-minimum, non-maximum suppression operator, a scanning-window based non-maximum suppression operator, a gather operator, a scatter operator, a statistics operator, a classifier operator, an integral image operator, comparison operators, indexing operators, a pattern matching operator, a feature extraction operator, a feature detection operator, a two-stage object detection operator, a score generating operator, a block reduction operator, and an upsample operator. The types of operations performed by the CNN module 190b to extract features from the training data may be varied according to the design criteria of a particular implementation.

Each of the hardware modules 190a-190n may implement a processing resource (or hardware resource or hardware engine). The hardware engines 190a-190n may be operational to perform specific processing tasks. In some configurations, the hardware engines 190a-190n may operate in parallel and independent of each other. In other configurations, the hardware engines 190a-190n may operate collectively among each other to perform allocated tasks. One or more of the hardware engines 190a-190n may be homogenous processing resources (all circuits 190a-190n may have the same capabilities) or heterogeneous processing resources (two or more circuits 190a-190n may have different capabilities).

Figure 4:
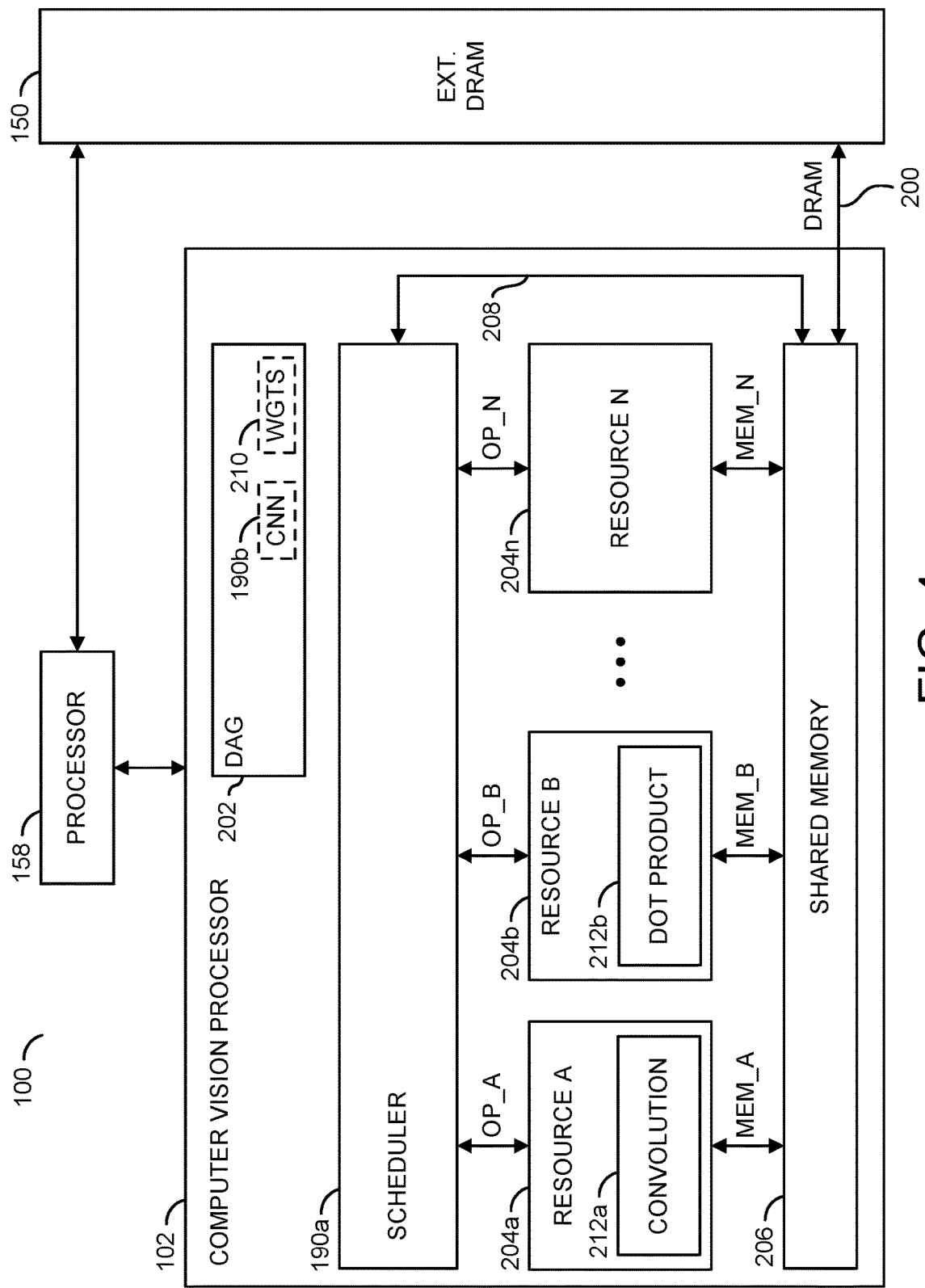
FIG. 4 is a diagram illustrating processing circuitry of a camera system implementing a convolutional neural network configured to perform 3D reconstruction.

Referring to FIG. 4, a diagram illustrating processing circuitry of a camera system implementing a convolutional neural network configured to perform 3D reconstruction is shown. In an example, processing circuitry of the camera system 100 may be configured for applications including, but not limited to autonomous and semi-autonomous vehicles (e.g., cars, trucks, motorcycles, agricultural machinery, drones, airplanes, etc.), manufacturing, and/or security and surveillance systems. In contrast to a general purpose computer, the processing circuitry of the camera system 100 generally comprises hardware circuitry that is optimized to provide a high performance image processing and computer vision pipeline in a minimal area and with minimal power consumption. In an example, various operations used to perform image processing, feature detection/extraction, 3D reconstruction, liveness detection, depth map generation and/or object detection/classification for computer (or machine) vision may be implemented using hardware modules designed to reduce computational complexity and use resources efficiently.

In an example embodiment, the processing circuit 100 may comprise the processor 102, the memory 150, the general purpose processor 158 and/or a memory bus 200. The general purpose processor 158 may implement a first processor. The processor 102 may implement a second processor. In an example, the circuit 102 may implement a computer vision processor. In an example, the processor 102 may be an intelligent vision processor. The memory 150 may implement an external memory (e.g., a memory external to the circuits 158 and 102). In an example, the circuit 150 may be implemented as a dynamic random access memory (DRAM) circuit. The processing circuitry of the camera system 100 may comprise other components (not shown). The number, type and/or arrangement of the components of the processing circuitry of the camera system 100 may be varied according to the design criteria of a particular implementation.

The general purpose processor 158 may be operational to interact with the circuit 102 and the circuit 150 to perform various processing tasks. In an example, the processor 158 may be configured as a controller for the circuit 102. The processor 158 may be configured to execute computer readable instructions. In one example, the computer readable instructions may be stored by the circuit 150. In some embodiments, the computer readable instructions may comprise controller operations. The processor 158 may be configured to communicate with the circuit 102 and/or access results generated by components of the circuit 102. In an example, the processor 158 may be configured to utilize the circuit 102 to perform operations associated with one or more neural network models.

In an example, the processor 102 generally comprises the scheduler circuit 190a, a block (or circuit) 202, one or more blocks (or circuits) 204a-204n, a block (or circuit) 206 and a path 208. The block 202 may implement a directed acyclic graph (DAG) memory. The DAG memory 202 may comprise the CNN module 190b and/or weight/bias values 210. The blocks 204a-204n may implement hardware resources (or engines). The block 206 may implement a shared memory circuit. In an example embodiment, one or more of the circuits 204a-204n may comprise blocks (or circuits) 212a-212n. In the example shown, the circuit 212a and the circuit 212b are implemented as representative examples in the respective hardware engines 204a-204b. One or more of the circuit 202, the circuits 204a-204n and/or the circuit 206 may be an example implementation of the hardware modules 190a-190n shown in association with FIG. 3.

In an example, the processor 158 may be configured to program the circuit 102 with one or more pre-trained artificial neural network models (ANNs) including the convolutional neural network (CNN) 190b having multiple output frames in accordance with embodiments of the invention and weights/kernels (WGTS) 210 utilized by the CNN module 190b. In various embodiments, the CNN module 190b may be configured (trained) for operation in an edge device. In an example, the processing circuitry of the camera system 100 may be coupled to a sensor (e.g., video camera, etc.) configured to generate a data input. The processing circuitry of the camera system 100 may be configured to generate one or more outputs in response to the data input from the sensor based on one or more inferences made by executing the pre-trained CNN module 190b with the weights/kernels (WGTS) 210. The operations performed by the processor 158 may be varied according to the design criteria of a particular implementation.

In various embodiments, the circuit 150 may implement a dynamic random access memory (DRAM) circuit. The circuit 150 is generally operational to store multidimensional arrays of input data elements and various forms of output data elements. The circuit 150 may exchange the input data elements and the output data elements with the processor 158 and the processor 102.

The processor 102 may implement a computer vision processor circuit. In an example, the processor 102 may be configured to implement various functionality used for computer vision. The processor 102 is generally operational to perform specific processing tasks as arranged by the processor 158. In various embodiments, all or portions of the processor 102 may be implemented solely in hardware. The processor 102 may directly execute a data flow directed to execution of the CNN module 190b, and generated by software (e.g., a directed acyclic graph, etc.) that specifies processing (e.g., computer vision, 3D reconstruction, liveness detection, etc.) tasks. In some embodiments, the processor 102 may be a representative example of numerous computer vision processors implemented by the processing circuitry of the camera system 100 and configured to operate together.

In an example, the circuit 212a may implement convolution operations. In another example, the circuit 212b may be configured to provide dot product operations. The convolution and dot product operations may be used to perform computer (or machine) vision tasks (e.g., as part of an object detection process, etc.). In yet another example, one or more of the circuits 204c-204n may comprise blocks (or circuits) 212c-212n (not shown) to provide convolution calculations in multiple dimensions. In still another example, one or more of the circuits 204a-204n may be configured to perform 3D reconstruction tasks.

In an example, the circuit 102 may be configured to receive directed acyclic graphs (DAGs) from the processor 158. The DAGs received from the processor 158 may be stored in the DAG memory 202. The circuit 102 may be configured to execute a DAG for the CNN module 190b using the circuits 190a, 204a-204n, and 206.

Multiple signals (e.g., OP_A-OP_N) may be exchanged between the circuit 190a and the respective circuits 204a-204n. Each of the signals OP_A-OP_N may convey execution operation information and/or yield operation information. Multiple signals (e.g., MEM_A-MEM_N) may be exchanged between the respective circuits 204a-204n and the circuit 206. The signals MEM_A-MEM_N may carry data. A signal (e.g., DRAM) may be exchanged between the circuit 150 and the circuit 206. The signal DRAM may transfer data between the circuits 150 and 190a (e.g., on the transfer path 208).

The scheduler circuit 190a is generally operational to schedule tasks among the circuits 204a-204n to perform a variety of computer vision related tasks as defined by the processor 158. Individual tasks may be allocated by the scheduler circuit 190a to the circuits 204a-204n. The scheduler circuit 190a may allocate the individual tasks in response to parsing the directed acyclic graphs (DAGs) provided by the processor 158. The scheduler circuit 190a may time multiplex the tasks to the circuits 204a-204n based on the availability of the circuits 204a-204n to perform the work.

Each circuit 204a-204n may implement a processing resource (or hardware engine). The hardware engines 204a-204n are generally operational to perform specific processing tasks. The hardware engines 204a-204n may be implemented to include dedicated hardware circuits that are optimized for high-performance and low power consumption while performing the specific processing tasks. In some configurations, the hardware engines 204a-204n may operate in parallel and independent of each other. In other configurations, the hardware engines 204a-204n may operate collectively among each other to perform allocated tasks.

The hardware engines 204a-204n may be homogenous processing resources (e.g., all circuits 204a-204n may have the same capabilities) or heterogeneous processing resources (e.g., two or more circuits 204a-204n may have different capabilities). The hardware engines 204a-204n are generally configured to perform operators that may include, but are not limited to, a resampling operator, a warping operator, component operators that manipulate lists of components (e.g., components may be regions of a vector that share a common attribute and may be grouped together with a bounding box), a matrix inverse operator, a dot product operator, a convolution operator, conditional operators (e.g., multiplex and demultiplex), a remapping operator, a minimum-maximum-reduction operator, a pooling operator, a non-minimum, non-maximum suppression operator, a gather operator, a scatter operator, a statistics operator, a classifier operator, an integral image operator, an upsample operator and a power of two downsample operator, etc.

In an example, the hardware engines 204a-204n may comprise matrices stored in various memory buffers. The matrices stored in the memory buffers may enable initializing the convolution operator. The convolution operator may be configured to efficiently perform calculations that are repeatedly performed for convolution functions. In an example, the hardware engines 204a-204n implementing the convolution operator may comprise multiple mathematical circuits configured to handle multi-bit input values and operate in parallel. The convolution operator may provide an efficient and versatile solution for computer vision and/or 3D reconstruction by calculating convolutions (also called cross-correlations) using a one-dimensional or higher-dimensional kernel. The convolutions may be useful in computer vision operations such as object detection, object recognition, edge enhancement, image smoothing, etc. Techniques and/or architectures implemented by the invention may be operational to calculate a convolution of an input array with a kernel. Details of the convolution operator may be described in association with U.S. Pat. No. 10,310,768, filed on Jan. 11, 2017, appropriate portions of which are hereby incorporated by reference. In various embodiments, the hardware engines 204a-204n may be implemented solely as hardware circuits. In some embodiments, the hardware engines 204a-204n may be implemented as generic engines that may be configured through circuit customization and/or software/firmware to operate as special purpose machines (or engines). In some embodiments, the hardware engines 204a-204n may instead be implemented as one or more instances or threads of program code executed on the processor 158 and/or one or more processors 102, including, but not limited to, a vector processor, a central processing unit (CPU), a digital signal processor (DSP), or a graphics processing unit (GPU). In some embodiments, one or more of the hardware engines 204a-204n may be selected for a particular process and/or thread by the scheduler 190a. The scheduler 190a may be configured to assign the hardware engines 204a-204n to particular tasks in response to parsing the directed acyclic graphs stored in the DAG memory 202.

The circuit 206 may implement a shared memory circuit. The shared memory 206 may be configured to store data in response to input requests and/or present data in response to output requests (e.g., requests from the processor 158, the DRAM 150, the scheduler circuit 190a and/or the hardware engines 204a-204n). In an example, the shared memory circuit 206 may implement an on-chip memory for the computer vision processor 102. The shared memory 206 is generally operational to store all of or portions of the multidimensional arrays (or vectors) of input data elements and output data elements generated and/or utilized by the hardware engines 204a-204n. The input data elements may be transferred to the shared memory 206 from the DRAM circuit 150 via the memory bus 200. The output data elements may be sent from the shared memory 206 to the DRAM circuit 150 via the memory bus 200.

The path 208 may implement a transfer path internal to the processor 102. The transfer path 208 is generally operational to move data from the scheduler circuit 190a to the shared memory 206. The transfer path 208 may also be operational to move data from the shared memory 206 to the scheduler circuit 190a.

The processor 158 is shown communicating with the computer vision processor 102. The processor 158 may be configured as a controller for the computer vision processor 102. In some embodiments, the processor 158 may be configured to transfer instructions to the scheduler 190a. For example, the processor 158 may provide one or more directed acyclic graphs to the scheduler 190a via the DAG memory 202. The scheduler 190a may initialize and/or configure the hardware engines 204a-204n in response to parsing the directed acyclic graphs. In some embodiments, the processor 158 may receive status information from the scheduler 190a. For example, the scheduler 190a may provide a status information and/or readiness of outputs from the hardware engines 204a-204n to the processor 158 to enable the processor 158 to determine one or more next instructions to execute and/or decisions to make. In some embodiments, the processor 158 may be configured to communicate with the shared memory 206 (e.g., directly or through the scheduler 190a, which receives data from the shared memory 206 via the path 208). The processor 158 may be configured to retrieve information from the shared memory 206 to make decisions. The instructions performed by the processor 158 in response to information from the computer vision processor 102 may be varied according to the design criteria of a particular implementation.

Figure 5:
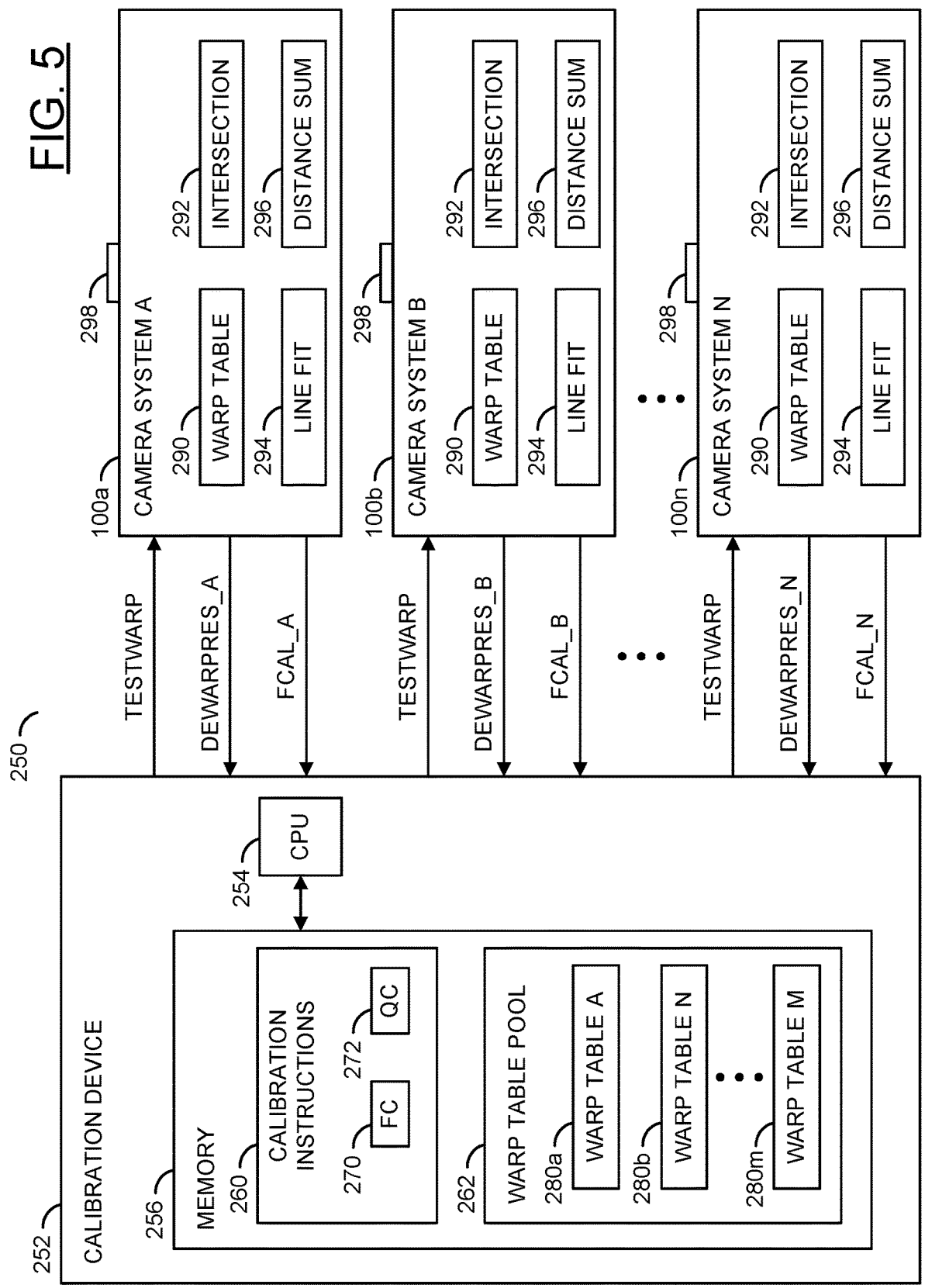
FIG. 5 is a block diagram illustrating an example calibration device configured to perform quick RGB-IR calibration verification for mass production process of edge device cameras.

Referring to FIG. 5, a block diagram illustrating an example calibration device configured to perform quick RGB-IR calibration verification for a mass production process of edge device cameras is shown. A calibration system 250 is shown. The calibration system 250 may comprise a number of camera systems 100a-100n and a block (or circuit) 252. The circuit 252 may implement a calibration device. The camera systems 100a-100n may represent a large amount of cameras developed during mass production. For example, the camera systems 100a-100n may represent hundreds or thousands of cameras being produced (e.g., a production run).

The calibration device 252 may be configured to perform the sensor and/or lens calibration for each of the camera systems 100a-100n. For illustrative purposes, the calibration device 252 is shown connected to multiple camera systems 100a-100n. However, in some embodiments, each of the camera systems 100a-100n may be calibrated by the calibration device 252 individually (e.g., one connection at a time). In some embodiments, the cameras 100a-100n may be calibrated by the calibration device 252 in batches that comprise less than all of the total number of camera systems 100a-100n that have been produced (e.g., multiple connections at a time).

The calibration device 252 may be a computing device. For example, the calibration device 252 may be implemented as a smartphone, a feature phone, a tablet, a phablet, a desktop computer, a laptop/notebook computer, a netbook (e.g., a Chromebook), an ASIC, etc. The calibration device 252 may implement an operating system (e.g., Windows, Mac OS X, Linux, Android, Chrome OS, iOS, etc.). The calibration device 252 may comprise a block (or circuit) 254 and/or a block (or circuit) 256. The circuit 254 may implement a CPU. The circuit 256 may implement a memory. The calibration device 252 may comprise other components (not shown). The number, type and/or arrangement of the components of the calibration device 252 and/or the type of device that implements the calibration device 252 may be varied according to the design criteria of a particular implementation.

The CPU 254 may be a general purpose processor circuit. The CPU 254 may be operational to interact with the memory 256 and/or the camera systems 100a-100n to perform various processing tasks. The CPU 254 may be configured to execute computer readable instructions. In one example, the computer readable instructions may be stored by the memory 256. In some embodiments, the computer readable instructions may comprise calibration operations. In some embodiments, the computer readable instructions may comprise generating warp tables in response to the calibration operations. In some embodiments, the computer readable instructions may comprise storing and/or retrieving warp tables to/from a warp table pool. In some embodiments, the computer readable instructions may comprise applying one of the warp tables to one or more of the camera systems 100a-100n. Generally, input from the camera systems 100a-100n and/or human interface devices may be received and/or processed by the CPU 254. The CPU 254 may be configured to receive and/or analyze data and make decisions in response to the input. In one example, the CPU 254 may implement a 32-bit instruction set (e.g., x86). In another example, the CPU 254 may implement a 64-bit instruction set (e.g., AMD64). In yet another example, the CPU 254 may implement an ARM instruction set. In still another example, the CPU 254 may implement a RISC-V instruction set. The architecture and/or the computer readable instructions implemented by the CPU 254 may be varied according to the design criteria or a particular implementation.

In some embodiments, the CPU 254 may comprise or have access to a graphics processing unit (GPU). For example, the CPU 254 may be a combined graphics processing unit and/or general processing unit. The graphics processing unit may be implemented to efficiently perform image and/or video processing calculations.

The memory 256 may store data. The memory 256 may implement various types of memory including, but not limited to, a cache, flash memory, a memory card, random access memory (RAM), dynamic RAM (DRAM) memory, etc. The type and/or size of the memory 256 may be varied according to the design criteria of a particular implementation. The memory 256 may be accessed by the CPU 254.

The memory 256 may comprise a block (or circuit) 260 and/or a block (or circuit) 262. The block 260 may comprise calibration instructions. The block 262 may comprise a warp table pool. The memory 256 may comprise other types of storage that has not been shown for illustrative purposes (e.g., an operating system, swap data, user data, etc.). The number, type and/or arrangement of the data stored by the memory 256 may be varied according to the design criteria of a particular implementation.

The calibration instructions 260 may comprise computer readable instructions that may be executed by the CPU 254. The calibration instructions 260 may be configured to generate warp tables that may be applied to the camera systems 100a-100n. The calibration instructions 260 may be configured to analyze images, detect warping, determine a dewarp to correct warping, analyze results of a dewarping effect, provide instructions for calibration to the camera systems 100a-100n, etc. The calibration instructions 260 may be configured to perform various calculations that may be used to correct for distortion characteristics of the lens 160 of each of the camera systems 100a-100n (e.g., correct inaccuracies to pixel data caused by the characteristics of the lens 160). The corrections to the distortion characteristics may comprise a warp table that may be applied to the camera systems 100a-100n.

The calibration instructions 260 may comprise a block (or circuit) 270 and/or a block (or circuit) 272. The block 270 may comprise instructions for performing a full calibration technique. The block 272 may comprise instructions for performing a quick calibration technique. The calibration instructions 260 may comprise other instruction sets. The number and/or type of instructions performed by the calibration instructions 260 may be varied according to the design criteria of a particular implementation.

The warp table pool 262 may comprise a number of blocks (or circuits) 280a-280m. The blocks 280a-280m may comprise warp tables (e.g., configured warp tables). The warp table pool 262 may comprise storage for a number of the configured warp tables 280a-280m generated by the calibration device 252.

The full calibration technique 270 may be configured to generate the configured warp tables 280a-280m. The calibration device 252 may perform the full calibration technique 270 at least once to generate one of the configured warp tables 280a-280m. For example, if a single one of the configured warp tables 280a-280m is accurate for each of the camera systems 100a-100n, then the full calibration technique 270 may be performed first to generate the configured warp table and then the quick calibration technique 272 may be performed. However, a single warp table accurate for each of the camera systems 100a-100m may be unlikely. In another example, if each of the camera systems 100a-100n are unable to share one of the configured warp tables then the full calibration technique 270 may be performed for each of the camera systems 100a-100n. However, none of the configured warp tables 280a-280m being able to be shared for some of the camera systems 100a-100n may be unlikely. The full calibration technique 270 may be performed each time the available configured warp tables 280a-280m currently in the warp table pool 262 are determined to not be accurate for the one of the camera systems 100a-100n that is currently being calibrated.

The full calibration technique 270 may be configured to generate an accurate warp table for a particular one of the camera systems 100a-100n. The accurate warp table generated by the full calibration technique 270 may be added to the warp table pool 262 as one of the configured warp tables 280a-280m. The full calibration technique 270 may be configured to determine the characteristics of the sensor 180 and/or the lens 160 of one of the camera systems 100a-100n and calculate a dewarp table that may compensate for the characteristics of the sensor 180 and/or the lens 160. The full calibration technique 270 may comprise some operations that may be performed by the camera systems 100a-100n (e.g., capturing images at precise locations from a target) and some operations that may be performed by the calibration device 252 (e.g., evaluating the images, generating the warp table and evaluating the warp table).

Generally, the full calibration technique 270 may be a time-consuming and/or resource intensive process. Determining a perfect warp table may comprise repeated calibration loop iterations. Each iteration of the calibration loop may be time-consuming. For example, the full calibration technique 270 may involve precisely aiming one of the camera systems 100a-100n from a particular distance at a dot pattern board with a particular amount of rotation. The precise aiming may be performed multiple times in one iteration of the full calibration technique 270 in order to capture multiple images from precise angles and distances (e.g., nine images may be captured). In an example, the full calibration technique 270 may take approximately twenty minutes to a half an hour to perform.

The full calibration technique 270 may not always generate the perfect warp table in one iteration. For example, the calibration device 252 may evaluate the warp table generated in response to the full calibration technique 270. If the calibration device 252 determines that the warp table generated does not perfectly match the real distortion, then the calibration device 252 may repeat the full calibration technique 270 (e.g., another iteration that may add another twenty minutes to half an hour to perform).

The quick calibration technique 272 may be configured to test the available configured warp tables 280a-280m on the camera systems 100a-100n. The quick calibration technique 272 may be configured to determine whether one of the previously determined configured warp tables 280a-280m provides accurate dewarping. The quick calibration technique 272 may be configured to apply one of the configured warp tables 280a-280m to the camera systems 100a-100n if one of the configured warp tables 280a-280m provides an accurate dewarp effect. The quick calibration technique 272 may comprise some operations that may be performed by the camera systems 100a-100n (e.g., performing various tests using one of the configured warp tables 280a-280m) and some operations that may be performed by the calibration device 252 (e.g., evaluation of the results of the tests performed by the camera systems 100a-100n).

The quick calibration technique 272 may not be able to generate new configured warp tables 280a-280m for the warp table pool 262. The quick calibration technique 272 may be configured to apply existing configured warp tables 280a-280m that are already in the warp table pool 262 to one or more of the camera systems 100a-100n. The quick calibration technique 272 may be configured to determine a result of one of the configured warp tables 280a-280m on correcting distortions that may be caused by the sensor 180 and/or the lens 160. If one of the configured warp tables 280a-280m corrects the distortions (e.g., provides an accurate dewarp effect), then one of the configured warp tables 280a-280m may be applied. If none of the configured warp tables 280a-280m correct the distortions (e.g., no currently available warp table provides an accurate dewarp effect), then the full calibration technique 270 may be performed to generate the accurate dewarp effect.

After the warp table pool 262 comprises at least one of the configured warp tables 280a-280m, the quick calibration technique 272 may be performed on the camera systems 100a-100n. The quick calibration technique 272 may test each of the available configured warp tables 280a-280m to determine if any of the configured warp tables 280a-280m provide the accurate dewarp effect. For example, the configured warp tables 280a-280m may be tested iteratively using the quick calibration technique 272. The quick calibration technique 272 may be performed faster than the full calibration technique 270. The quick calibration technique 272 may use less human resources than the full calibration technique 270. The quick calibration technique 272 may be faster and/or less resource intensive than the full calibration technique 270, even if the warp table pool 262 comprises many of the configured warp tables 280a-280m. Each time the quick calibration technique 272 determines that one of the configured warp tables 280a-280m provides an accurate dewarp effect for one of the camera systems 100a-100n, the system 250 may skip one performance of the full calibration technique 270. For mass production of the camera systems 100a-100n, there may be additional time savings for each time the full calibration technique 270 is skipped. Since at least some of the configured warp tables 280a-280m may be used by more than one of the camera systems 100a-100n by using the quick calibration technique 272, there may be fewer of the configured warp tables 280a-280m stored in the warp table pool 262 than the total number of the camera systems 100a-100n.

For calibration during mass production of the camera systems 100a-100n, some of the camera systems 100a-100n may be calibrated before other of the camera systems 100a-100n. As the camera systems 100a-100n are calibrated during the mass production, the full calibration technique 270 may be performed to add more of the configured warp tables 280a-280m to the warp table pool 262. As a result of the configured warp tables 280a-280m being added to the warp table pool 262 over time, the camera systems 100a-100n that are calibrated earlier in the mass production process may have fewer of the configured warp tables 280a-280m available for testing using the quick calibration technique 272. With fewer of the configured warp tables 280a-280m available for testing, the quick calibration technique 272 may end sooner if none of the configured warp tables 280a-280m are determined to be suitable. As more of the configured warp tables 280a-280m are added to the warp table pool 262 during the mass production process, the camera systems 100a-100n calibrated later on in the mass production process may have more of the configured warp tables 280a-280m available for testing using the quick calibration technique 272. With more of the configured warp tables 280a-280m available for testing, the quick calibration technique 272 take longer if none of the configured warp tables 280a-280m are determined to be suitable (e.g., more iterations may be used to test the additional configured warp tables).

The length of time to perform the quick calibration technique 272 may vary based on the number of the configured warp tables 280a-280m in the warp table pool 262. In an example, one iteration of the quick calibration technique 272 for one of the configured warp tables 280a-280m may take approximately 300 ms-350 ms. The 300 ms-350 ms time for testing one of the configured warp tables 280a-280m may be repeated for each of the configured warp tables 280a-280m in the warp table pool 262. However, when one of the configured warp tables 280a-280m provides the proper dewarp effect, the quick calibration technique 272 may stop (e.g., the rest of the configured warp tables 280a-280m no longer need to be tested). Therefore, an accurate result when testing one of the first configured warp tables 280a-280m in the warp table pool 262 may result in the quick calibration technique 272 ending faster than when one of the last configured warp tables 280a-280m in the warp table pool 262 provides the accurate result.

A signal (e.g., TESTWARP) may be communicated by the calibration device 252 to each of the camera systems 100a-100n. The signal TESTWARP may comprise a communication of one of the configured warp tables 280a-280m to the camera systems 100a-100n. The signal TESTWARP may be communicated to one of the camera systems 100a-100n during the quick calibration technique 272 (e.g., once for each iteration of testing one of the warp tables 280a-280m). The signal TESTWARP may further apply the warp table if the dewarp effect is determined to be accurate by the quick calibration technique 272. In some embodiments, the signal TESTWARP may provide instructions that may be executed by the processor 102 of the camera systems 100a-100n to automate a portion of the quick calibration technique 272 that is performed by the camera systems 100a-100n. The signal TESTWARP may also provide the accurate warp table generated using the full calibration technique 270.

Signals (e.g., DEWARPRES_A-DEWARPRES_N) may be communicated by a respective one of the camera systems 100a-100n to the calibration device 252. The signals DEWARPRES_A-DEWARPRES_N may comprise a resulting dewarp effect generated by the camera systems 100a-100n after applying one of the configured warp tables 280a-280m. A respective one of the signals DEWARPRES_A-DEWARPRES_N may be communicated each time one of the configured warp tables 280a-280m is tested during the quick calibration technique 272 (e.g., once for each iteration of testing one of the warp tables 280a-280m). The quick calibration technique 272 may analyze the results in the signals DEWARPRES_A-DEWARPRES_N to determine whether the dewarp effect is accurate. The calibration device 252 may apply the tested warp table to the camera systems 100a-100n if the dewarp effect is accurate (e.g., via the signal TESTWARP).

Signals (e.g., FCAL_A-FCAL_N) are shown communicated by the respective camera systems 100a-100n to the calibration device 252. The signals FCAL_A-FCAL_N may comprise data communicated during the full calibration technique 270. The signals FCAL_A-FCAL_N may be communicated to the calibration device 252 from the respective one of the camera systems 100a-100n each time the full calibration technique 270 is performed. The data communicated in the signals FCAL_A-FCAL_N may be images generated by the camera systems 100a-100n (e.g., nine high resolution images) that the calibration device 252 may use to generate the configured warp tables 280a-280m. In an example, the signals FCAL_A-FCAL_N may comprise image data that may be used by the full calibration technique 270 in order to generate a new one of the calibrated warp tables 280a-280m for the warp table pool 262 and provide the accurate warp table to the camera systems 100a-100n. The full calibration technique 270 may present the accurate warp table to the respective one of the camera systems 100a-100n using the signal TESTWARP, in response to the respective one of the signals FCAL_A-FCAL_N.

The camera systems 100a-100n are shown comprising a block (or circuit) 290, a block (or circuit) 292, a block (or circuit) 294, a block (or circuit) 296 and/or a block (or circuit) 298. The circuit 290 may comprise a warp table (e.g., an applied warp table). The circuit 292 may comprise an intersection detection module. The circuit 294 may comprise a line fitting module. The circuit 296 may comprise a distance summation module. The circuit 298 may comprise an input module. The camera systems 100a-100n may comprise other components (e.g., components as described in association with FIGS. 1-4). In an example, the applied warp table 290 may be stored in the memory 150. In an example, the modules 292-296 may be implemented as one of the hardware modules 190a-190n. In another example, the modules 292-296 may be implemented as one of the hardware resources 204a-204n. In yet another example, the modules 292-296 may be implemented as part of the CNN module 190b. In one example, the input module 298 may be implemented as part of the human interface device 166. The arrangement and/or implementation of the modules 292-298 may be varied according to the design criteria of a particular implementation.

The applied warp table 290 may be implemented by the camera systems 100a-100n in order to correct distortion caused by physical characteristics of the lens 160 and/or the sensor 180. The distortion caused by the lens 160 and/or the sensor 180 may be different and/or unique for each of the camera systems 100a-100n. However, some of the distortion caused by the lens 160 and/or the sensor 180 may be similar between one or more of the camera systems 100a-100n. The applied warp table 290 may be used by the processor 102 of the camera systems 100a-100n in order to compensate for physical defects in the lens 160 and/or the sensor 180. The applied warp table 290 may be updated, modified and/or replaced. In an example, the applied warp table 290 may comprise a matrix of values that the processor 102 may apply to the pixel data generated in order to compensate for the lens 160 and/or the sensor 180.

The full calibration technique 270 may be configured to generate the applied warp table 290 that may provide a warp table with perfect (or near perfect) accuracy. After the full calibration technique 270, the calibration device 252 may present the signal TESTWARP that may provide the accurate warp table to be used as the applied warp table 290. During the quick calibration technique 272, the signal TESTWARP may iteratively provide one of the configured warp tables 280a-280m to be used as the applied warp table 290. The results of the dewarp effect using one of the configured warp tables 280a-280m as the applied warp table 290 may be communicated as the signals DEWARPRES_A-DEWARPRES_N to the calibration device 252. If the quick calibration technique 272 determines the dewarp effect is accurate, then the current one of the configured warp tables 280a-280m may be used as the applied warp table 290.

The intersection detection module 292 may be configured to determine an accuracy of the dewarp effect while one of the configured warp tables 280a-280m are being used as the applied dewarp table 290. The intersection detection module 292 may be configured to analyze an image of a test pattern (e.g., a checkerboard pattern) and fetch intersection points. Operations performed by the intersection detection module 292 may comprise a portion of the quick calibration technique 272 that may be performed by the processor 102 of the camera systems 100a-100n. Details of the intersection detection performed by the intersection detection module 292 may be described in association with FIG. 7.

The line fitting module 294 may be configured to determine an accuracy of the dewarp effect while one of the configured warp tables 280a-280m are being used as the applied dewarp table 290. The line fitting module 294 may be configured to implement a line fitting function across the intersections points fetched using the intersection detection module 292. In one example, the line fitting module 294 may implement an ordinary least square technique in order to calculate a linear fitting function for the intersection points. Operations performed by the line fitting module 294 may comprise a portion of the quick calibration technique 272 that may be performed by the processor 102 of the camera systems 100a-100n. Details of the line fitting performed by the line fitting module 294 may be described in association with FIG. 8.

The distance summation module 296 may be configured to determine an accuracy of the dewarp effect while one of the configured warp tables 280a-280m are being used as the applied dewarp table 290. The distance summation module 296 may be configured to calculate a sum of the distances of the intersection points to the line(s) calculated using the line fitting module 294. The distances may be calculated as a number of pixels from the line(s). The sum of the distances calculated may be used to determine the accuracy of the dewarp effect. In an example, if the lines in the checkerboard image used during the quick calibration technique 272 are captured and processed as absolutely straight, then the sum of the distances may be 0 pixels. In an example, the signals DEWARPRES_A-DEWARPRES_N may comprise the sum of distances calculated by the distance summation module 296. Operations performed by the distance summation module 296 may comprise a portion of the quick calibration technique 272 that may be performed by the processor 102 of the camera systems 100a-100n.

The input module 298 may be configured to receive input from a person (e.g., an operator, a technician, an engineer, etc.) during the full calibration technique 270 and/or during the quick calibration technique 272. In an example, the input module 298 may enable the person to start the automated portion of the quick calibration technique 272 after one of the camera systems 100a-100n is aimed at the target image. In another example, the input module 298 may enable the person to start capturing one of the test images for the full calibration technique 270 each time one of the camera systems 100a-100n is aimed at the target image. In the example shown, the input module 298 is illustrated as a mechanical button. In some embodiments, the input module 298 may be a touchscreen input. In some embodiments, the input module 298 may be a speaker configured to receive a voice command. The type of input received by the input module 298 may be varied according to the design criteria of a particular implementation.

The system 250 may calibrate each of the camera systems 100a-100n during mass production. To generate a first of the configured warp tables 280a-280m for the warp table pool 262, the full calibration technique 270 may be performed on the camera system 100a. The full calibration technique 270 may calculate the applied warp table 290 for the camera system 100a that provides an accurate dewarp effect. The applied warp table 290 may be added to the warp table pool 262.

After the warp table pool 262 has at least one of the configured warp tables 280a-280m, the calibration device 252 may perform the quick calibration technique 272 on the remaining camera systems 100b-100n. The quick calibration technique 272 may test the currently available calibrated warp tables 280a-280m on the camera system 100b. For example, if the camera systems 100b is calibrated second during mass production after the camera system 100a, then only the configured warp table 280a may be available for the quick calibration technique 272. The quick calibration technique 272 may test the calibrated warp table 280a as the applied warp table 290 for the camera system 100b. The camera system 100b may generate the results of the dewarp effect using the modules 292-296. If the configured warp table 280a provides an accurate dewarp effect, then the configured warp table 280a may be used as the applied warp table 290 for the camera system 100b. If the configured warp table 280a does not provide an accurate dewarp effect, then a next one of the configured warp tables 280a-280m may be tested.

When the camera system 100b is calibrated second after the camera system 100a, only the configured warp table 280a may currently be in the warp table pool 262, and there may not be other warp tables to test. When none of the configured warp tables 280a-280m provide an accurate dewarp effect, then the full calibration technique 270 may be performed. The full calibration technique 270 may calculate the applied warp table 290 for the camera system 100b and then add the applied warp table 290 from the camera system 100b to the warp table pool 262 as the configured warp table 280b.

The calibration process performed by the calibration device 252 may be repeated for the rest of the camera systems 100c-100n. Each time the full calibration technique 270 is performed to determine the applied warp table 290 for one of the camera systems 100a-100n a new one of the calibrated warp tables 280a-280m may be added to the warp table pool 262. Each time the quick calibration technique 272 determines that one of the configured warp tables 280a-280m may provide an accurate dewarp effect for one of the camera systems 100a-100n, the one of the configured warp tables 280a-280m that provided the accurate dewarp effect may be used as the applied warp table 290 and the full calibration technique 270 may not be performed. During mass production, the number of times that the quick calibration technique 272 may determine that one of the camera systems 100a-100n may be calibrated using one of the previously generated configured warp tables 280a-280m may be varied depending on the similarities in distortion caused by the lens 160 and/or sensor 180 of the camera systems 100a-100n.

Figure 6:
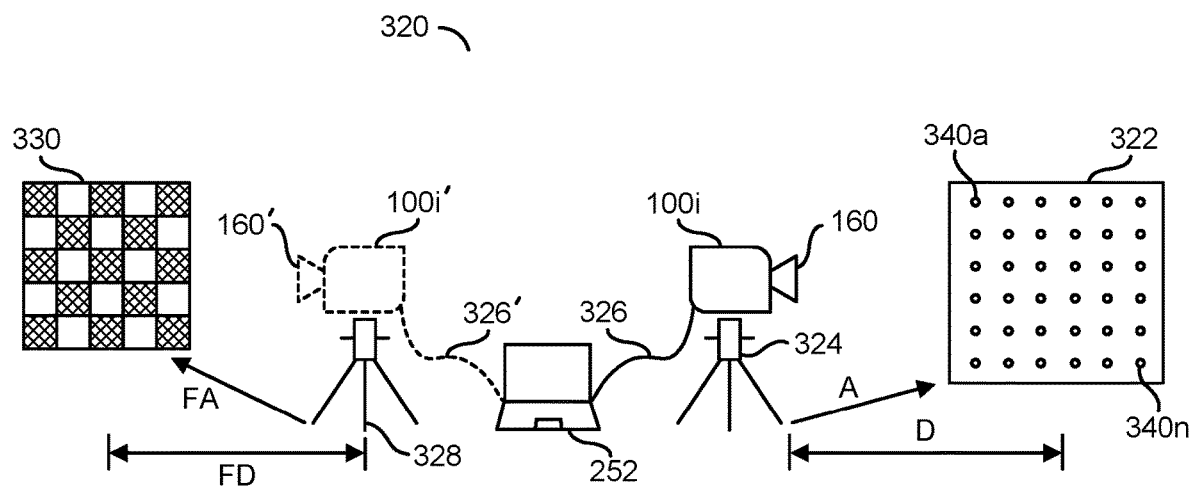
FIG. 6 is a diagram illustrating using a calibration device to perform RGB-IR sensor calibration.

Referring to FIG. 6, a diagram illustrating using a calibration device to perform RGB-IR sensor calibration is shown. A calibration environment 320 is shown. The calibration environment 320 may be used to calibrate the camera systems 100a-100n during mass production of the camera systems 100a-100n.

The calibration environment 320 may comprise the camera system 100i, the calibration device 252, a full calibration target 322, a full calibration stand 324, a cable 326, a quick calibration stand 328 and/or a quick calibration target 330. The camera system 100i may be a representative example of the camera systems 100a-100n. For example, each of the camera systems 100a-100n may be calibrated individually in the calibration environment 320 during mass production. In the example shown, the calibration device 252 may be implemented as a laptop computer.

In the example shown, the camera system 100i is shown mounted on the full calibration stand 324 and aimed at the full calibration target 322. The dotted illustration of the camera system 100i (e.g., 100i') is shown mounted on the quick calibration stand 328 and aimed at the quick calibration target 330. During mass production, the person may move the camera system 100a-100n between the full calibration stand 324 and the quick calibration stand 328. The camera system 100i mounted on the full calibration stand 324 may represent one of the camera systems 100a-100n set up for the full calibration technique 270. The camera system 100i' mounted on the quick calibration stand 328 may represent the same one of the camera systems 100a-100n set up for the quick calibration technique 272.

The full calibration target 322 may comprise a dot pattern board. The full calibration target 322 may be a particular size and/or shape. The full calibration target 322 may be a dot pattern board. In the example shown, the full calibration target 322 may be a 1 meter by 1 meter dot pattern board. The full calibration target 322 may comprise a dot pattern 340a-340n.

The dot pattern 340a-340n may comprise a pattern of dots. The dot pattern 340a-340n may be precisely located on the full calibration target 322 to enable the full calibration technique 270. In some embodiments, the dot pattern 340a-340n may comprise dots having different sizes. In some embodiments, the dot pattern 340a-340n may comprise dots having a consistent size and/or spacing. The dot pattern 340*a*-340*n* may provide a reference pattern to enable the full calibration technique 270 to calculate the applied warp table 290 with a perfect dewarp effect for the camera systems 100*a*-100*n* and/or add the applied warp table 290 to the warp table pool 262 as one of the configured warp tables 280*a*-280.

The full calibration stand 324 may provide a stable and consistent support for the camera system 100*i* for the full calibration technique 270 to be performed. The full calibration stand 324 is shown with the lens 160 at a distance D and an angle A from the full calibration target 322. In an example, the distance D may be approximately 1.5 meters away from the calibration target 322.

The cable 326 (and the cable 326' for the camera system 100*i*' on the quick calibration stand 328) may enable a wired communication between the camera system 100*i* and the calibration device 252. In one example, during the full calibration technique 270, the cable 326 may provide the signal FCAL_I from the camera system 100*i* to the calibration device 252 and the cable 326 may provide the signal TESTWARP from the calibration device 252 to the camera system 100*i*. In one example, during the quick calibration technique 272, the cable 326 may provide the signal TESTWARP from the calibration device 252 to the camera system 100*i* and the signal DEWARPRES_I from the camera system 100*i* to the calibration device 252. In the example shown for the calibration environment 320, the communication may be a wired connection over the cable 326. In some embodiments, the communication between the camera system 100*i* and the calibration device 252 may be wireless. For example, the calibration device 252 may implement wireless communication (e.g., Wi-Fi, Bluetooth, etc.) and the camera system 100*i* may communicate the images, warp tables, results and/or other data using the communication module 154. The protocol used for communication between the camera system 100*i* and the calibration device 252 may be varied according to the design criteria of a particular implementation.

For the full calibration technique 270, at least 9 images may be captured towards to the calibration target 322. Each of the images captured may be at different orientations and/or locations. For example, for each image, the angle A may be changed, an orientation of the lens 160 may be rotated and/or the location of the camera system 100*i* may be changed. A precision of the rotation and/or the movement of the camera device 100*i* may be essential for each capture. Due to the stringent requirements for the placement and/or orientation of the camera system 100*i* (e.g., the distance D and the angle A) with respect to the full calibration target 322, a person may manually rotate and redirect the camera system 100*i* and capture a next one of the calibration images (e.g., by using the input module 298 when the camera system 100*i* is properly aligned with the full calibration target 322).

After the calibration images of the full calibration target 322 are captured, the images (e.g., comprising the dot pattern 340*a*-340*n*) may be communicated to the calibration device 252. The CPU 254 may execute the full calibration technique 270 in order to calculate a new warp table based on the calibration image inputs (e.g., from the signal FCAL_I). The full calibration technique 270 may generate an output warp table. The output warp table may be communicated to the camera system 100*i* (e.g., form the signal TESTWARP) to be used as the applied warp table 290. The full calibration technique 270 may perform an evaluation of the result using the output warp table. If the evaluation result is determined to be not good enough (e.g., insufficient accuracy of the dewarp result), then the calibration images may have to be re-captured and an updated warp table may be re-calculated.

Multiple iterations of capturing calibration images may be needed for the full calibration technique 270 to generate an accurate warp table for the camera system 100*i*. The accurate warp table may be used as the applied warp table 290 for the camera system 100*i*. The accurate warp table may be stored in the warp table pool 262.

For the full calibration technique 270, the calibration device 252 may store pre-defined known values for the dot pattern 340*a*-340*n* in the memory 256. In an example, the total number of dots (e.g., rows and columns) and the distances between the dots in the dot pattern 340*a*-340*n* for the full calibration target 322 may be known (and stored) in advance. The pre-defined known values may be the target values (e.g., gold standard or perfect values) for the calibration result.

For the nine high resolution dot pattern images captured by the camera system 100*i* during the full calibration technique 270, the calibration device 252 may calculate a distortion difference between the dots from the captured dot pattern image and the reference (e.g., the pre-defined known values). The comparison of the dot pattern in the captured images and the reference may be used by the calibration device 252 to quantify the distortion of the lens 160. In response to the quantification of the distortion of the lens 160, the calibration device 252 may generate the accurate warp table.

The calibration device 252 may evaluate the result (e.g., the generated accurate warp table) based on two aspects. The calibration device 252 may check whether a union of dot pattern area from the nine high resolution images covers the entire field of view of the lens 160 (e.g., to ensure that the full area of the lens 160 is evaluated). The calibration device 252 may output a fitting error result. The fitting error result may be compared to a pre-determined threshold. In an example, the pre-determined threshold may be under 0.2. The fitting error result may quantify an error level between the real distortion from the captured images of the full calibration target 322 and the calculated distortion from a fitting function. If the fitting error is close to zero pixels, then the calculated fitting function may exactly reproduce the real distortion of the lens 160. If the error level is above the pre-determined threshold, then the full calibration technique 270 may be repeated.

A distance (e.g., FD) and an angle (e.g., FA) are shown between the lens 160' of the camera system 100*i*' on the quick calibration stand 328 and the quick calibration target 330. The distance FD may represent a fixed distance. The angle FA may represent a fixed angle. The quick calibration stand 328 may be placed at the fixed distance FD and at the fixed orientation (e.g., the fixed angle FA) with respect to the quick calibration target 330. For the quick calibration technique 272, the location of the camera system 100*i*' may not be moved. Not moving the location of the quick calibration stand 328 may provide some of the time savings for the quick calibration technique 272 compared to the full calibration technique 270 (e.g., the full calibration stand 324 may be moved multiple times to capture the nine high resolution images).

The fixed distance FD may be determined based on the size of the quick calibration target 330. The quick calibration target 330 is shown as a checkerboard image. The quick calibration stand 328 may be located to ensure that the checkerboard for the quick calibration target 330 occupies almost the full field of view of the lens 160'. In an example, the camera system 100*i'* may be placed approximately 0.4 m away from the quick calibration target 330 having a 30 cm×20 cm checkerboard pattern. For the mass production using the quick calibration technique 272, the quick calibration stand 328 may be adjusted only once at the beginning by the person (e.g., an initial setup). For the rest of the mass production process, the person may mount each of the camera systems 100*a*-100*n* onto the quick calibration stand 328 (e.g., without moving the quick calibration stand 328) to perform the quick calibration technique 272. Since the portions of the quick calibration technique 272 that are performed on the camera systems 100*a*-100*n* (e.g., the intersection detection, the line fitting, the distance summation, etc.) may be an automated process (e.g., initialized by pressing the input module 298), no additional human interaction may be needed for the quick calibration technique 272 after the camera system 100*i* has been mounted.

In the example shown, the image used for the full calibration target 322 (e.g., the dot pattern 340*a*-340*n*) may be different than the image used for the quick calibration target 330 (e.g., the checkerboard image). In some embodiments, the same image may be used for the full calibration target 322 and the quick calibration target 330. The selection of the images used for the full calibration target 322 and the quick calibration target 330 may depend on the various warp table generation tools implemented by the calibration device 252. For example, some of the libraries (e.g., OpenCV) may enable using a checkerboard image for the full calibration target 322 instead of the dot pattern 340*a*-340*n*. Generally, the size, dimension and/or distances from the camera system 100*i* for the checkerboard image (or the dot pattern 340*a*-340*n*) may be varied according to the design criteria of a particular implementation. Generally, the images captured for the full calibration technique 270 and the quick calibration technique 272 may be RGB images.

During the mass production process, the person performing the calibration for the camera systems 100*a*-100*n* may use the quick calibration stand 328 and then the full calibration stand 324 if the quick calibration technique 272 is unable to find an accurate warp table in the warp table pool 262. Since the quick calibration technique 272 may use a constant angle and distance (e.g., the fixed angle FA and the fixed distance FD), the quick calibration stand 328 may be properly aligned with the quick calibration target 330 to enable fast mounting of the camera systems 100*a*-100*n* for the quick calibration technique 272 without readjustment of the quick calibration stand 328. The full calibration technique 270 requires regularly moving the angle A and/or the distance D (e.g., once for each of the nine images). The full calibration stand 324 may be a separate stand to prevent readjusting the fixed angle FA and the fixed distance FD for the quick calibration target 330 after the full calibration technique 270 is performed (e.g., the person would be busy recovering and adjusting the same stand if only one stand was used).

To perform the mass production, the person may mount the camera system 100*i* to the quick calibration stand 328 to perform the quick calibration technique 272. If one of the configured warp tables 280*a*-280*m* from the warp table pool 262 provides the accurate result, a next one of the camera systems 100*a*-100*n* may be mounted to the quick calibration stand 328 for the quick calibration technique 272. If none of configured warp tables 280*a*-280*m* in the warp table pool 262 provides the accurate result, then the full calibration technique 270 may be performed. The user may unmount the camera system 100*i* from the quick calibration stand 328 and move the camera system 100*i* to the full calibration stand 324 to initiate the full calibration technique 270 (e.g., as the full calibration technique 270 instructs, the full calibration stand 324 may be adjusted at least nine times for the nine different angles).

Figure 7:
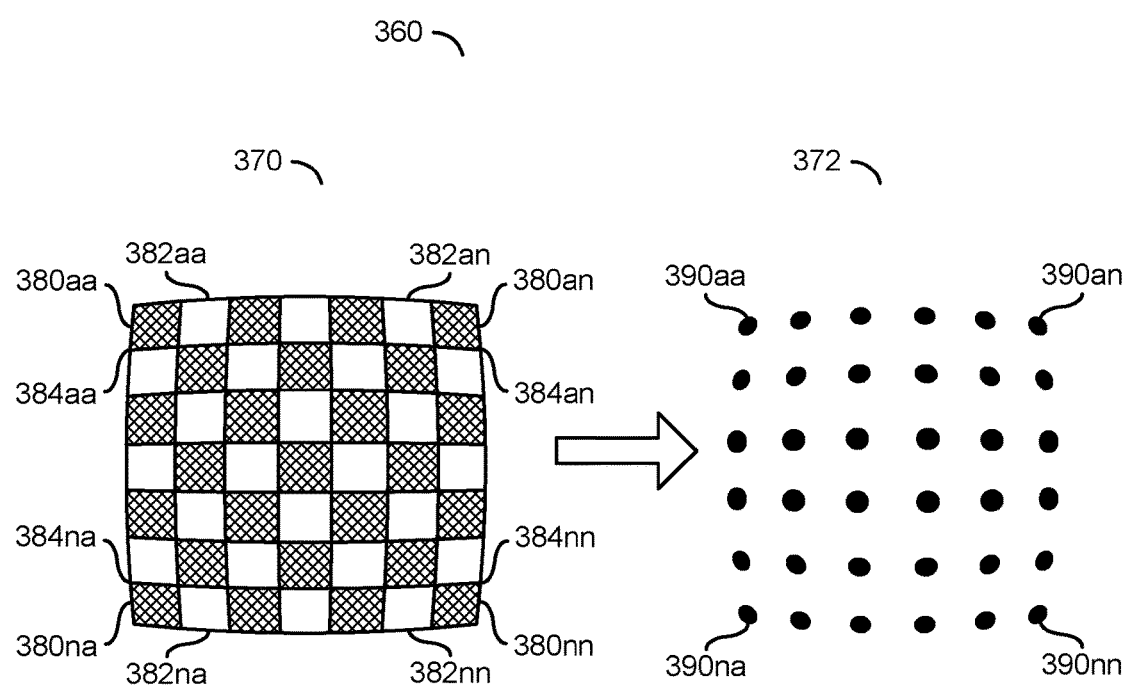
FIG. 7 is a diagram illustrating an evaluation of a dewarp effect based on fetching intersection points from a checkerboard pattern.

Referring to FIG. 7, a diagram illustrating an evaluation of a dewarp effect based on fetching intersection points from a checkerboard pattern is shown. An example portion of quick calibration evaluation 360 is shown. The example portion of the quick calibration evaluation 360 may correspond to the checkerboard intersection detection implemented by the intersection detection module 292. For example, the example portion of the quick calibration evaluation 360 may comprise a portion of the quick calibration technique 272 that may be performed by the processor 102 of the camera systems 100*a*-100*n*.

The portion of the quick calibration evaluation 360 may comprise a checkerboard image 370 captured by the camera system 100*i* and fetched intersection points 372. The checkerboard image 370 may comprise pixel data arranged as a video frame of the quick calibration target 330 shown in association with FIG. 6. For the quick calibration technique 272, the quick calibration target 330 may comprise a checkerboard pattern board. After one of the configured warp tables 280*a*-280*m* are applied to the camera system 100*i*, the camera system 100*i* may capture calibration images of the quick calibration target 330 at the fixed distance FD and the fixed angle FA. The checkerboard image 370 may comprise one of the calibration images captured. For example, the capture device 104 may generate pixel data (e.g., the signal VIDEO), and the processor 102 may process the pixel data arranged as video frames to generate the checkerboard image 370.

The checkerboard image 370 is shown having a slight warping effect. In the example shown, the warping effect may be a bulge effect (e.g., the center of the checkerboard image 370 appears as if something is pushing outwards from behind creating an effect where the center appears closer to the lens 160 than the outer edges of the checkerboard image 370). The warping effect may illustrate the distortion that may be caused by the physical characteristics of the lens 160 and/or the sensor 180 and/or the effect of the applied warp table 290.

In the example shown, the checkerboard image 370 may be generally a square shape. The fixed distance FD and the fixed angle FA may be selected such that the quick calibration target 330 captured in the checkerboard image 370 may take up almost the full field of view of the lens 160 and/or the sensor 180. Ideally, the intersection points of the checkerboard pattern 370 may be close to the borders of the field of view. The borders of the field of view may have the most distortion in the captured images. The size, dimension and/or the distance of checkerboard image 370 may be varied based on the field of view of the lens 160. The dimensions and/or aspect ratio of the checkerboard image 370 may be varied according to the design criteria of a particular implementation.

The checkerboard image 370 may comprise alternating dark squares 380*aa*-380*nn* and light squares 382*aa*-382*nn*. The alternating dark squares 380*aa*-380*nn* and light squares 382*aa*-382*nn* may form a grid in a checkerboard pattern. The alternating dark squares 380*aa*-380*nn* and light squares 382*aa*-382*nn* may provide a high contrast reference of differentiation (e.g., visual transitions) between evenly spaced locations on the quick calibration target 330. The number and/or size of the alternating dark squares 380*aa*-380*nn* and light squares 382*aa*-382*nn* may be varied according to the design criteria of a particular implementation.

Intersection points 384*aa*-384*nn* are shown on the checkerboard image 370. The intersection points 384*aa*-384*nn* may correspond to locations where the corners of at least two of the alternating dark squares 380*aa*-380*nn* and light squares 382*aa*-382*nn* meet. In the example shown, the intersection point 384*aa* may intersect at an edge of the checkerboard image 370. However, the intersection points 384*aa*-384*nn* may be located throughout the middle of the checkerboard image 370 where the alternating dark squares 380*aa*-380*nn* and light squares 382*aa*-382*nn* meet.

The checkerboard image 370 may be analyzed by the processor 102 of the camera system 100*i*. The intersection detection unit 292 may be configured to fetch the intersection points 384*aa*-384*nn*. The fetched intersection points 372 may be generated by the intersection detection module 292 in response to the checkerboard image 370.

The fetched intersection points 372 may comprise the detected intersection points 390*aa*-390*nn*. The detected intersection points 390*aa*-390*nn* may correspond to the intersection points 384*aa*-384*nn* of the checkerboard image 370. In an example, the detected intersection point 390*aa* may correspond to the intersection point 384*aa*. The fetched intersection points 372 may be extracted from the checkerboard image 370 by the intersection detection module 292 by detecting high contrast differences and/or transitions in the checkerboard image 370. The fetched intersection points 372 may be presented to the line fitting module 294.

Figure 8:
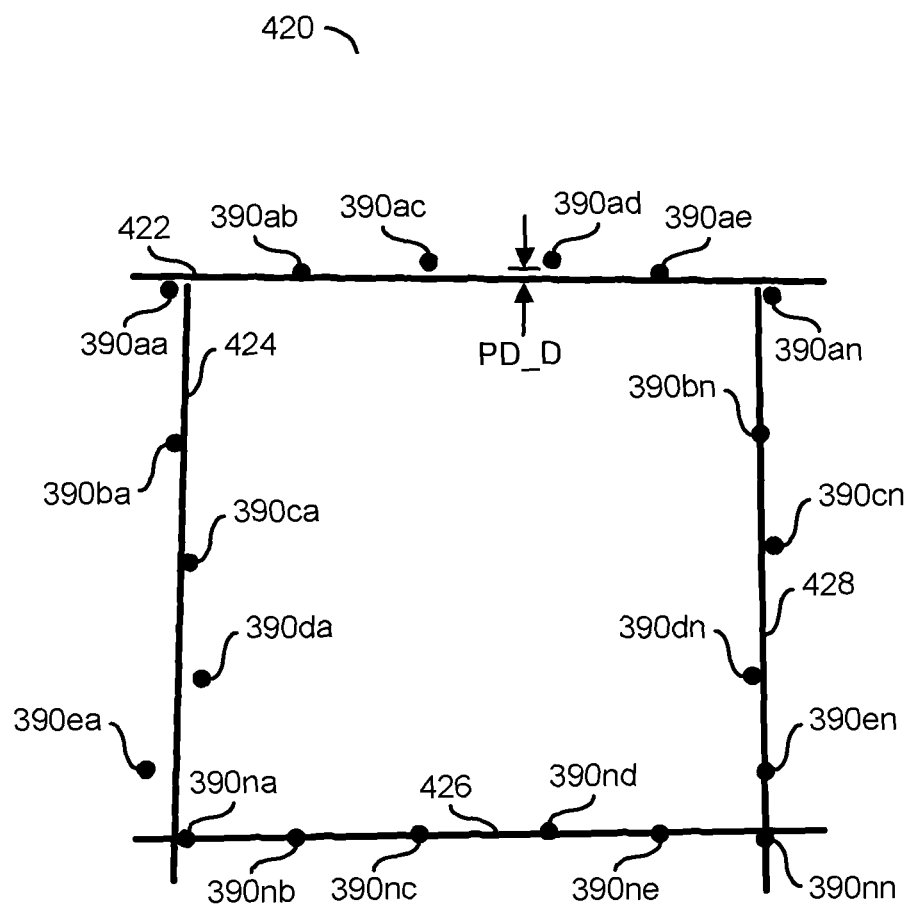
FIG. 8 is a diagram illustrating an evaluation of a dewarp effect based on calculating a line straightness of intersection points after a dewarp operation.

Referring to FIG. 8, a diagram illustrating an evaluation of a dewarp effect based on calculating a line straightness of intersection points after a dewarp operation is shown. An example portion of a quick calibration evaluation 420 is shown. The portion of the quick calibration evaluation 420 may correspond to the straightness of intersection point calculations implemented by the line fitting module 294 and/or the sum of distances calculation implemented by the distance summation module 296.

The quick calibration evaluation 420 may comprise a row of the intersection points 390*aa*-390*an*, a row of the intersection points 390*na*-390*nn*, a column of the intersection points 390*aa*-390*na*, a column of the intersection points 390*an*-390*nn*, a line 422, a line 424, a line 426 and a line 428. In the example shown, the row of the intersection points 390*aa*-390*an*, the row of the intersection points 390*na*-390*nn*, the column of the intersection points 390*aa*-390*na*, and the column of the intersection points 390*an*-390*nn* may each comprise six of the intersection points 390*aa*-390*nn* extracted by the intersection detection module 292. While six of the intersection points 390*aa*-390*nn* are shown extracted for each of the rows and columns of the intersection points 390*aa*-390*nn* for illustrative purposes, the rows and columns of the intersection points 390*aa*-390*nn* used for the quick calibration evaluation 420 may comprise any number of intersection points (e.g., dependent upon the number of the intersection points 384*aa*-384*nn* in the checkerboard image 370 captured).

The lines 422-428 may each be a fitted line (e.g., a straight line) calculated by the line fitting module 294. The fitted line 422 may be calculated as a straight line to run closely through the intersection points 390*aa*-390*an*. The line fitting module 294 may be configured to determine a linear fitting function across the intersection points 390*aa*-390*an*. In one example, the line fitting module 294 may be configured to perform a least squares approximation technique in order to determine a linear fitting function for the fitted line 422 to run through the intersection points 390*aa*-390*an*. The fitted line 422 may be calculated in order to run through the intersection points 390*aa*-390*an* with the fitted line 422 calculated to be as close as possible to each of the intersection points 390*aa*-390*an*.

Similarly, the line fitting module 294 may be configured to determine the fitted lines 424-428. The fitted line 424 may be calculated to run closely through the intersection points 390*aa*-390*na*. The fitted line 426 may be calculated to run closely through the intersection points 390*na*-390*nn*. The fitted line 428 may be calculated to run closely through the intersection points 390*an*-390*nn*. For example, the quick calibration evaluation 420 may comprise the line fitting module 294 determining the four fitted lines 424-428 in response to the intersection points 390*aa*-390*nn* extracted by the intersection detection module 292.

Generally, for measuring distortion effects for the lens 160 and/or the sensor 180, the further away pixel data in an image frame captured is from the center of the lens 160, the larger the amount of distortion may be present. In order to test the distortion of the lens 160, the quick calibration technique 272 may perform an analysis of the amount of distortion detected in the captured checkerboard image 370 close to the border of the field of view of the lens 160. The lens 160' may be set at the fixed distance FD and the fixed angle FA in order for the camera system 100*i* to capture the quick calibration target 330 such that the quick calibration target 330 fills almost the entire field of view captured by the lens 160'. With the quick calibration target 330 filling the entire field of view of the lens 160', the captured checkerboard image 370 may fill an entire video frame with pixel data of the quick calibration target 330 (e.g., with no, or only a small amount of 'whitespace' on the edges of the video frame captured). The quick calibration evaluation 420 performed during the quick calibration technique 272 may perform the line fitting in order to test the four outermost edges (e.g., the topmost edge, the leftmost edge, the bottommost edge and the rightmost edge). Therefore, the line 422 may be a topmost edge line comprising the top row of the intersection points 390*aa*-390*an*, the line 424 may be a leftmost edge line comprising the left column of the intersection points 390*aa*-390*na*, the line 426 may be a bottommost edge line comprising the bottom row of the intersection points 390*na*-390*nn* and the line 428 may be a rightmost edge line comprising the right column of the intersection points 390*an*-390*nn*.

In the example shown, the fitted lines 422-428 are shown running through the outermost edges of the intersection points 390*aa*-390*nn* fetched from the checkerboard image 370. For example, using the fitted lines 422-428 for the outermost edges of the intersection points 390*aa*-390*nn* may provide a most accurate evaluation of the distortion by measuring the distortion at the sections of the lens 160 that may cause the greatest amount of distortion. In some embodiments, a single fitted line may be calculated for one row (or column) of the intersection points 390*aa*-390*nn* on one edge of the checkerboard image 370. In some embodiments, more than four of the fitted lines may be calculated for multiple rows (or columns) of the intersection points 390*aa*-390*nn*. In some embodiments, the fitted lines 422-428 may be calculated for various rows (or columns) of the intersection points 390*aa*-390*nn* throughout the middle of the intersection points 390*aa*-390*nn*. The number of fitted lines calculated and/or the location of the intersection points 390*aa*-390*nn* used for calculating the fitted lines may be varied according to the design criteria of a particular implementation.

The intersection point 390*aa* is shown below the fitted line 422 and not touching the fitted line 422. The intersection point 390*ab* is shown above the fitted line 422 and touching the fitted line 422. The intersection point 390*ac* is shown above the fitted line 422 and not touching the fitted line 422. The intersection point 390*ac* may have the largest absolute distance from the fitted line 422. The intersection point 390*ad* is shown above the fitted line 422 and not touching the fitted line 422. The intersection point 390*ae* is shown above the fitted line 422 and touching the fitted line 422. The intersection point 390*an* is shown below the fitted line 422 and not touching the fitted line 422. The fitted line 422 may be calculated with different distances and/or orientations of the intersection points 390*aa*-390*an* from the fitted line 422. However, the fitted line 422 may be determined to have a best fit (e.g., smallest sum of absolute distances). The path of the fitted line 422 through the intersection points 390*aa*-390*an* may be varied according to the characteristics of the distortion caused by the lens 160 and/or the sensor 180 for each individual camera system 100*a*-100*n* and the characteristics of the configured warp tables 280*a*-280*m* applied during the quick calibration 272.

After the line fitting module 294 calculates the fitted line 422, the distance summation module 296 may calculate an absolute distance of each of the intersection points 390*aa*-390*an* from the fitted line 422. A distance PD_D is shown as a representative example. The distance PD_D may illustrate an absolute distance of the intersection point 390*ad* from the fitted line 422. The distance PD_D may be measured in a number of pixels of the checkerboard image 370. The distance PD_D may be a positive value (e.g., an absolute value) regardless of whether the intersection point 390*ad* is above the fitted line 422, as shown, or below the fitted line 422. Similarly, for the fitted line 424 (or the fitted line 428) calculated for a vertical arrangement of the intersection points 390*aa*-390*na*, the distance measured may be a positive value regardless of whether the intersection point is to the left of the fitted line 424 or the intersection point is to the right of the fitted line 424.

The distance summation module 296 may be configured to calculate the absolute distance of each of the intersection points 390*aa*-390*an* from the fitted line 422. In the example shown, the intersection point 390*aa* may be a medium value (e.g., not touching the fitted line 422), the intersection point 390*ab* may be a small value (e.g., touching the fitted line 422 but not directly centered on the fitted line 422), the intersection point 390*ac* may be a large value (e.g., a large space between the fitted line 422), the intersection point 390*ad* may be a large value (e.g., a large space between the fitted line 422), the intersection point 390*ae* may be a small value (e.g., touching the fitted line 422), and the intersection point 390*an* may be a large value (e.g., a large space between the fitted line 422). If any of the intersection points 390*aa*-390*an* were directly centered on the fitted line 422, then the absolute value measured may be zero. If the intersection points 390*aa*-390*an* in the checkerboard image 370 are absolutely straight, the sum of the distances may be zero pixels.

The distance summation module 296 may calculate the sum of absolute distances for each of the fitted lines 422-428. For example, the distance summation module 296 may calculate the sum of absolute distances of the topmost row of intersection points 390*aa*-390*an* from the topmost edge line 422, the sum of absolute distances of the leftmost column of intersection points 390*aa*-390*na* from the leftmost edge line 424, the sum of absolute distances of the bottommost row of intersection points 390*na*-390*nn* from the bottommost edge line 426 and the sum of absolute distances of the rightmost column of intersection points 390*an*-390*nn*. Each of the absolute distances may be used to determine the results of the dewarp effect for the quick calibration technique 272.

The sum of the absolute distances calculated by the distance summation module 296 may be the dewarp effect results of the evaluation one of the configured warp tables 280*a*-280*m*. The sum of the absolute distances may be presented to the calibration device 252 as the signal DEWARPRES_I. The quick calibration technique 272 may determine whether the dewarp effect results using the tested one of the configured warp tables 280*a*-280*m* provides a sufficiently accurate result (e.g., based on a comparison to the pre-determined threshold value). If the dewarp effect results are sufficiently accurate, then the tested one of the configured warp tables 280*a*-280*m* may be used as the applied warp table 290 for the camera system 100*i*, the full calibration technique 270 may be skipped and the calibration device 252 may calibrate a next one of the camera systems 100*a*-100*n*. If the dewarp effect results are not sufficiently accurate, the quick calibration technique 272 may select another one of the configured warp tables 280*a*-280*m* to test, or the full calibration technique 270 may be performed if there are no more of the configured warp tables 280*a*-280*m* to test from the warp table pool 262. The sum value that results in a sufficiently accurate result may be varied according to the design criteria of a particular implementation.

Figure 9:
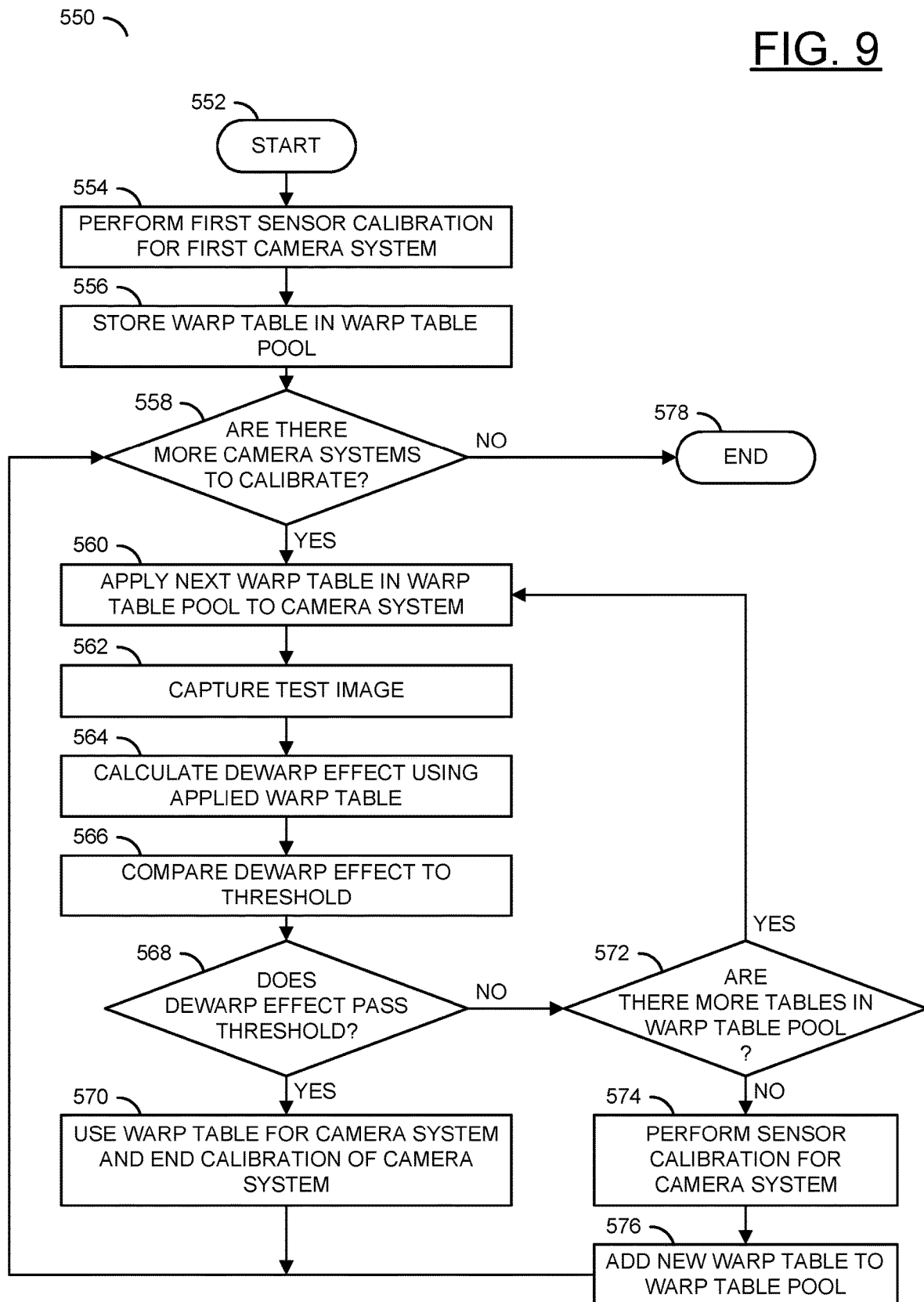
FIG. 9 is a flow diagram illustrating a method for performing quick RGB-IR calibration verification for a mass production process.

Referring to FIG. 9, a method (or process) 550 is shown. The method 550 may perform quick RGB-IR calibration verification for a mass production process. The method 550 generally comprises a step (or state) 552, a step (or state) 554, a step (or state) 556, a decision step (or state) 558, a step (or state) 560, a step (or state) 562, a step (or state) 564, a step (or state) 566, a decision step (or state) 568, a step (or state) 570, a decision step (or state) 572, a step (or state) 574, a step (or state) 576, and a step (or state) 578.

The step 552 may start the method 550. In the step 554, the system 250 may perform a first sensor calibration for the first of the camera systems 100*a*-100*n*. In an example, the warp table pool 262 may be empty and a technician may connect the camera system 100*a* to the calibration device 252. The calibration device 252 may perform the full calibration technique 270 to determine the applied warp table 290 for the camera system 100*a*. Next, in the step 556, the calibration device 252 may store the warp table determined using the full calibration technique 270 as one of the configured warp tables 280*a*-280*m* in the warp table pool 262. Next, the method 550 may move to the decision step 558.

In the decision step 558, the CPU 254 may determine whether there are any more of the camera systems 100*b*-100*n* to calibrate. For example, a batch of the camera systems 100*a*-100*n* may be fabricated during the mass production process. If there are more of the capture devices 100*b*-100*n* to calibrate, then the method 550 may move to the step 560. In the step 560, the calibration device 252 may apply a next one of the configured warp tables 280*a*-280*m* to one of the camera systems 100*b*-100*n* being calibrated using the quick calibration technique 272. For example, the configured warp tables 280*a*-280*m* may be communicated using the signal TESTWARP. Next, in the step 562, a test image may be captured by one of the camera systems 100*b*-100*n* being calibrated using a selected one of the configured warp tables 280*a*-280*m* as the applied warp table 290. In an example, the test image may be the checkerboard image 370 captured from the quick calibration target 330. Next, the method 550 may move to the step 564.

In the step 564, the one of the camera systems 100b-100n being calibrated may calculate a dewarp effect for the checkerboard image 370 using the applied warp table 290. For example, the processor 102 of the one of the camera systems 100b-100n may determine the intersection points 390aa-390nn, determine the fitted lines 422-428 and/or calculate the sum of distances as shown in association with FIGS. 7-8. The calculated dewarp effect may be presented to the calibration device 252 as one of the signals DEWARPRES_B-DEWARPRES_N. Next, in the step 566, the CPU 254 may compare the dewarp effect to a predetermined threshold. Next, the method 550 may move to the decision step 568.

In the decision step 568, the CPU 254 may determine whether the dewarp effect passes the predetermined threshold. The predetermined threshold may be a numerical value used to determine whether the dewarp effect provides sufficient accuracy. In one example, the predetermined threshold may be a configurable value that may be tuned by a technician. For example, the predetermined threshold may be modified based on the consumer use-case for the camera systems 100a-100n. For example, high security use-case scenarios may have a higher threshold set for accuracy compared to consumer-grade products. If the dewarp effect does pass the predetermined threshold, then the method 550 may move to the step 570. In the step 570, the quick calibration technique 272 may use the selected one of the configured warp tables 280a-280m as the applied warp table 290 and end calibration for the one of the camera systems 100b-100n being calibrated. Next, the method 550 may return to the decision step 558. For example, the quick calibration technique 272 may end if one of the configured warp tables 280a-280m provides the accurate dewarp effect. In the decision step 568, if the dewarp effect does not pass the predetermined threshold, then the method 550 may move to the decision step 572.

In the decision step 572, the CPU 254 may determine whether there are more of the configured warp tables 280a-280m in the warp table pool 262. For example, as the full calibration technique 270 is performed on more of the camera systems 100a-100n to determine the applied warp table 290, more of the configured warp tables 280a-280m may be added to the warp table pool 262 to be used during the quick calibration technique 272. If there are more of the configured warp tables 280a-280m in the warp table pool 262, then the method 550 may return to the step 560. For example, the quick calibration technique 272 may continue by testing the next of the configured warp tables 280a-280m. If there are no more of the configured warp tables 280a-280m in the warp table pool 262, then the method 550 may move to the step 574. For example, the quick calibration technique 272 may end after all of the configured warp tables 280a-280m in the warp table pool 262 have been tested and none provide the accurate dewarp effect.

In the step 574, the CPU 254 may perform the full calibration technique 270 for the one of the camera systems 100b-100n being calibrated. For example, the capture devices 100b-100n may capture the nine images and present the captured images to the calibration device 252 via the signals FCAL_B-FCAL_N. The full calibration technique 270 may generate the applied warp table 290 for the one of the camera systems 100b-100n being calibrated (e.g., via the signal TESTWARP). Next, in the step 576, the CPU 254 may add the new warp table generated for the applied warp table 290 as a new entry for the configured warp tables 280a-280m. For example, the total size of the warp table pool 262 may be increased by one when the full calibration technique 270 is performed. Next, the method 550 may return to the decision step 558.

In the decision step 558, if all of the camera systems 100a-100n have been calibrated, then the method 550 may move to the step 578. The step 578 may end the method 550.

Figure 10:
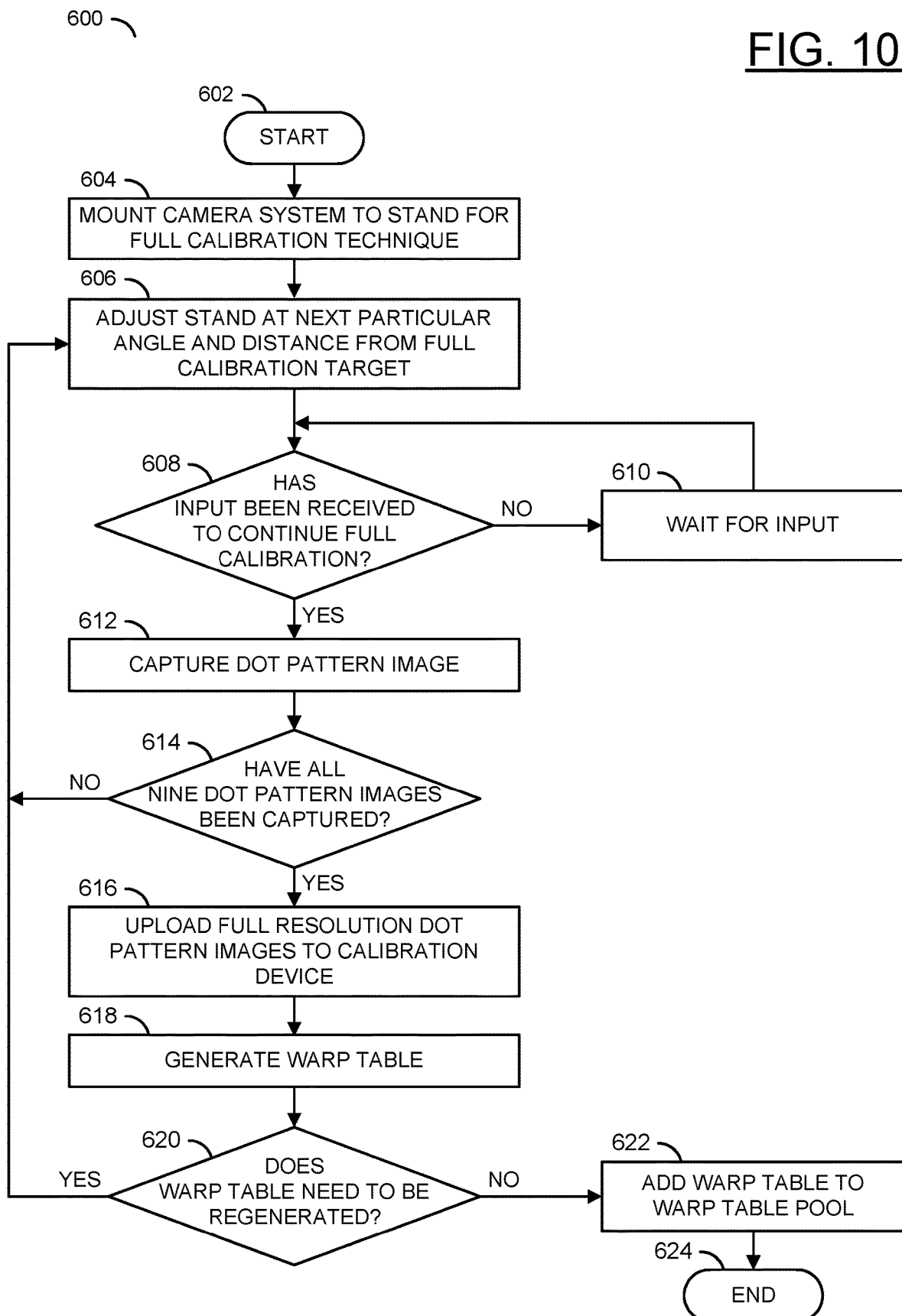
FIG. 10 is a flow diagram illustrating a method for adding configured warp tables to a warp table pool using a full calibration technique.

Referring to FIG. 10, a method (or process) 600 is shown. The method 600 may add configured warp tables to a warp table pool using a full calibration technique. The method 600 generally comprises a step (or state) 602, a step (or state) 604, a step (or state) 606, a decision step (or state) 608, a step (or state) 610, a step (or state) 612, a decision step (or state) 614, a step (or state) 616, a step (or state) 618, a decision step (or state) 620, a step (or state) 622, and a step (or state) 624.

The step 602 may start the method 600. In the step 604, the user may mount the camera system 100i to the full calibration stand 324 for the full calibration technique 270. Mounting the camera system 100i to the full calibration stand 324 may take approximately 1 minute to perform. Next, in the step 606, the user may adjust the full calibration stand 324 at a next particular angle A and distance D from the full calibration target 322. Each time the adjustment is performed (e.g., nine times for the nine full resolution images) may take approximately 1 minute. Next, the method 600 may move to the decision step 608.

In the decision step 608, the input module 298 may determine whether input has been received to continue the full calibration technique 270. For example, the full calibration technique 270 may pause while the user adjusts the angle A and the distance D in between each image capture. If no input has been detected, then the method 600 may move to the step 610. In the step 610, the processor 102 may wait for input from the input module 298. Next, the method 600 may return to the decision step 608. In an example, the user pressing the button for the input module 298 may take approximately 30 seconds (and may need to be repeated nine times, once for each image captured). In the decision step 608, if the input has been detected, then the method 600 may move to the step 612.

In the step 612, the processor 102 may capture the dot pattern image of the full calibration target 322. The image captured may be a 4K resolution (e.g., 3840×2160, and approximately 12 MB in file size). Capturing the image may take approximately 66 ms (and may be performed once for each of the nine images captured). Next, the method 600 may move to the decision step 614.

In the decision step 614, the user may determine whether all nine of the images for the full calibration technique 270 have been captured. If not, then the method 600 may return to the step 606 (e.g., the user may readjust the location and angle of the full calibration stand 324 and capture the next image). If all nine of the dot pattern images have been captured, then the method 600 may move to the step 616. In the step 616, the communication module 154 may upload the full resolution dot pattern images to the calibration device 252 (e.g., communicate one of the signals FCAL_A-FCAL_N). In an example, each image may take approximately one second to transfer over the cable 326 to the calibration device 252 (e.g., nine seconds total transfer). Next, in the step 618, the calibration device 252 may generate the new warp table. In one example, (e.g., dependent on the capabilities of the CPU 254 and/or other components of the calibration device 252) calculating the new warp table may take approximately five minutes. Next, the method 600 may move to the decision step 620.

In the decision step 620, the CPU 254 may determine whether the warp table needs to be regenerated. If the warp table does need to be regenerated, then the method 600 may return to the step 606. If the warp table does not need to be regenerated, then the method 600 may move to the step 622. In the step 622, the calibration device 252 may add the new warp table to the warp table pool 262 as one of the configured warp tables 280*a*-280*m*. The calibration device 252 may present the newly configured warp table to the one of the camera systems 100*a*-100*n* using the signal TESTWARP. Next, the method 600 may move to the step 624. The step 624 may end the method 600. In an example, the full calibration technique 270 may take approximately 21 minutes to perform.

Figure 11:
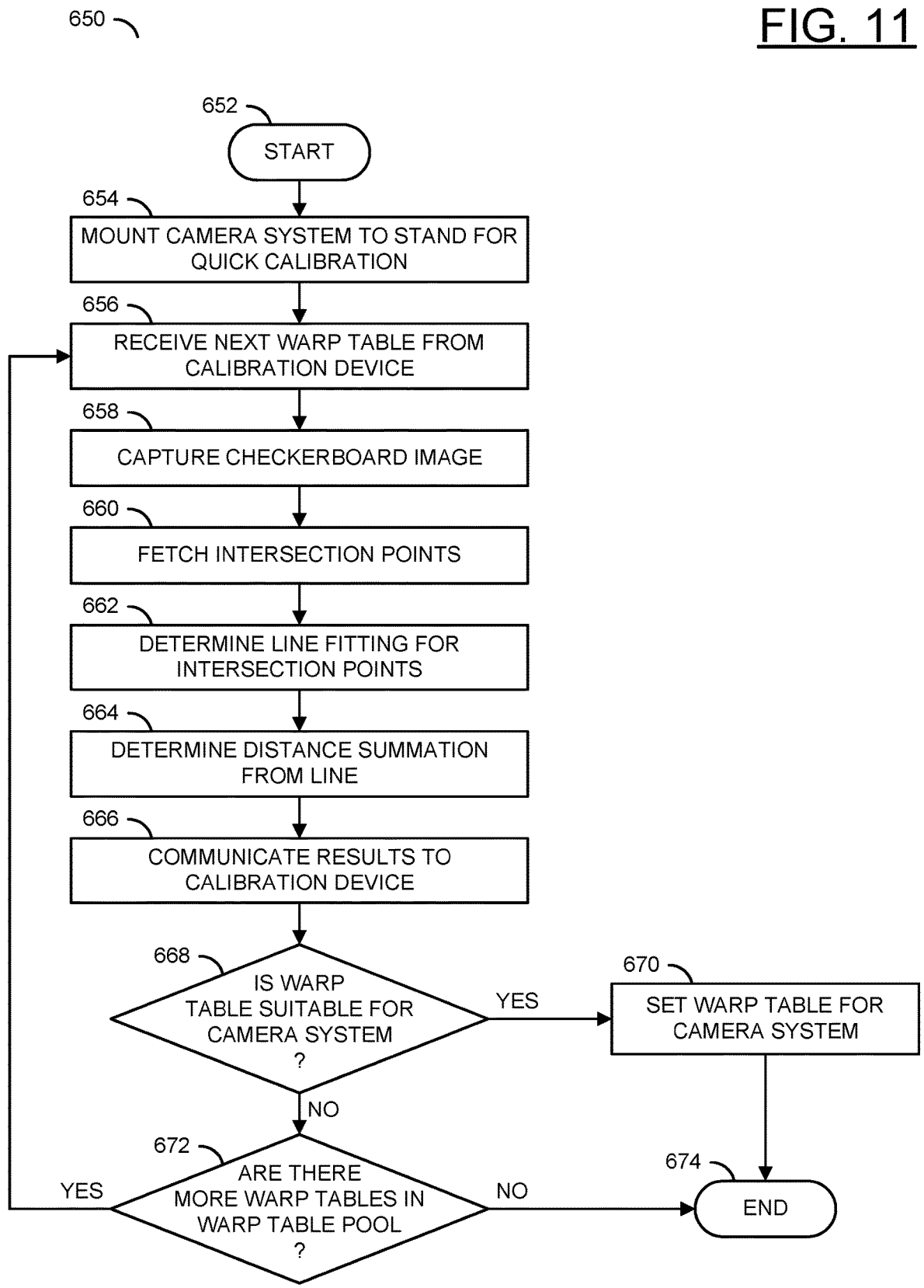
FIG. 11 is a flow diagram illustrating a method for performing a quick calibration technique.

Referring to FIG. 11, a method (or process) 650 is shown. The method 650 may perform a quick calibration technique. The method 650 generally comprises a step (or state) 652, a step (or state) 654, a step (or state) 656, a step (or state) 658, a step (or state) 660, a step (or state) 662, a step (or state) 664, a step (or state) 666, a decision step (or state) 668, a step (or state) 670, a decision step (or state) 672, and a step (or state) 674.

The step 652 may start the method 650. In the step 654, the user may mount the camera system 100*i* to the quick calibration stand 328 for the quick calibration technique 272. Mounting the camera system 100*i* to the quick calibration stand 328 may take approximately 1 minute to perform. Since the fixed angle FA and the fixed distance FD only need to be determined once, and the quick calibration stand 328 does not need to be moved again, the user may not need to adjust the location of the quick calibration stand 328. Next, in the step 656, the camera system 100*i* may receive the next one of the configured warp tables 280*a*-280*m* from the calibration device 252 (e.g., via the signal TESTWARP). In an example, one of the configured warp tables 280*a*-280*m* may be approximately 51 kB in size and take approximately 1 ms to transfer via the cable 326. In the step 658, the processor 102 may capture the checkerboard image 370. In one example, the checkerboard image 370 may take approximately 66 ms to capture. Next, the method 650 may move to the step 660.

In the step 660, the intersection detection module 292 may analyze the checkerboard image 370 and fetch the intersection points 390*aa*-390*nn*. Next, in the step 662, the line fitting module 294 may determine the line fittings for the intersection points 390*aa*-390*nn*. For example, the line fitting module 294 may calculate the topmost edge line 422, the leftmost edge line 424, the bottommost edge line 426 and the rightmost edge line 428. In the step 664, the distance summation module 296 may calculate the distance summation from each of the lines 422-428. Next, in the step 666, the camera systems 100*i* may communicate the results to the calibration device 252 for evaluation via one of the signals DEWARPRES_A-DEWARPRES_N. In an example, the intersection detection, the line fitting, the distance summation and/or the evaluation of the results of the dewarp effect for the quick calibration technique 272 may take approximately 240 ms. Next, the method 650 may move to the decision step 668.

In the decision step 668, the calibration device 252 may determine whether the one of the warp tables 280*a*-280*m* tested is suitable for the camera system 100*i*. If the warp table tested is suitable, then the method 650 may move to the step 670. In the step 670, the one of the configured warp tables 280*a*-280*m* that has was determined to be suitable may be used as the applied warp table 290. Next, the method 650 may move to the step 674. In the decision step 668, if the warp table tested is not suitable, then the method 650 may move to the decision step 672.

In the decision step 672, the calibration device 252 may determine whether there are any more of the configured warp tables 280*a*-280*m* remaining in the warp table pool 262 that have not yet been tested. If there are more of the configured warp tables 280*a*-280*m* in the warp table pool 262 that have not yet been tested, then the method 650 may return to the step 656 and a next one of the configured warp tables 280*a*-280*m* may be tested. If there are no more of the configured warp tables 280*a*-280*m* to test (e.g., all have been previously tested), then the method 650 may move to step 674 (e.g., the full calibration technique 270 may be performed). The step 674 may end the method 650. The quick calibration technique 272 may take approximately 1.5 minutes to perform if one hundred iterations of testing the configured warp tables 280*a*-280*m* are performed (e.g., one minute to mount one time and an additional 1 ms+66 ms+240 ms for each iteration, multiplied by the number of iterations performed). Generally, depending on luck and the number of the configured warp tables 280*a*-280*m* stored in the warp table pool 262 (e.g., approximately one hundred may be stored), approximately ten of the configured warp tables 280*a*-280*m* may be tested before a suitable match is found.

Figure 12:
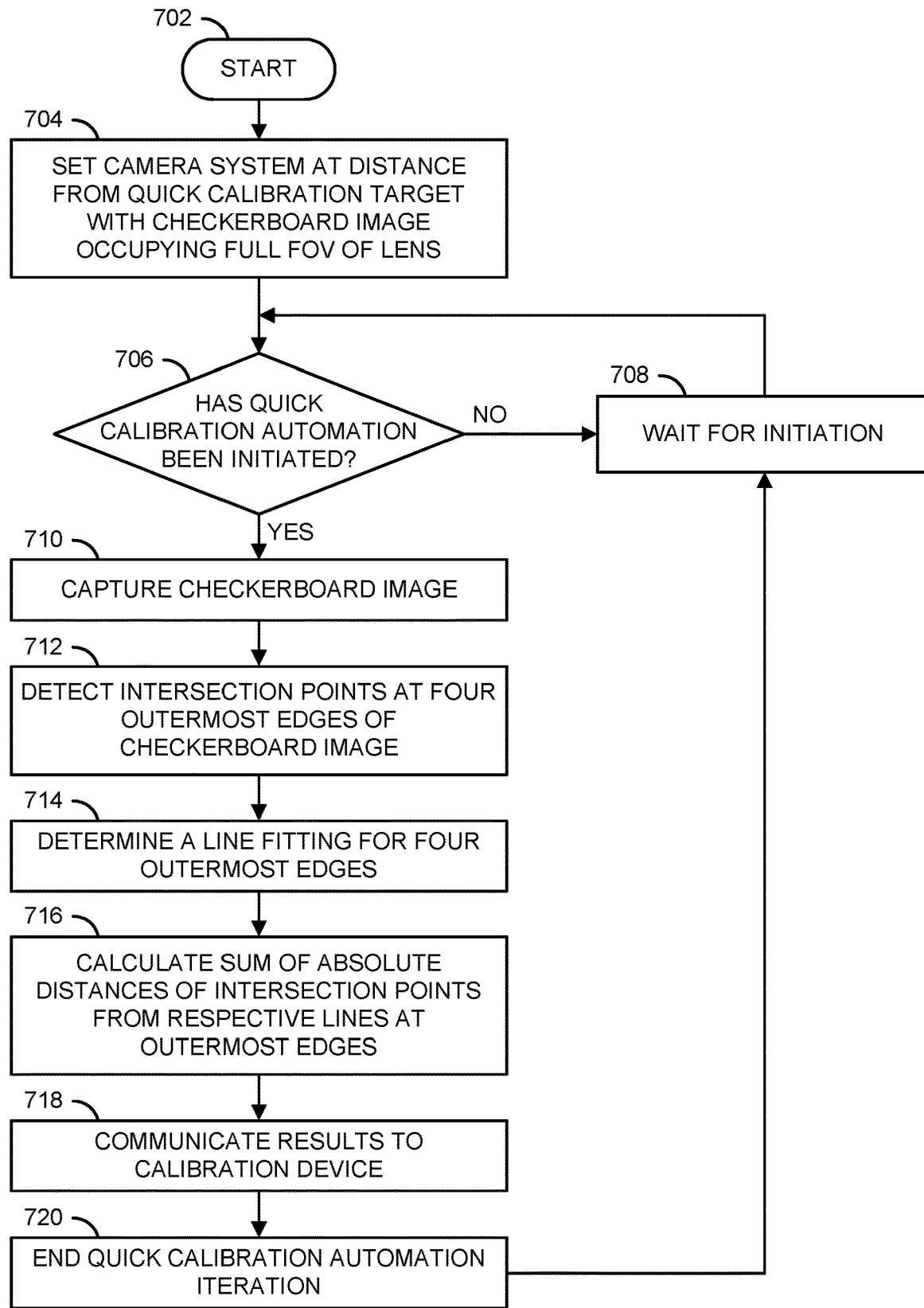
FIG. 12 is a flow diagram illustrating a method for automating a quick calibration technique for capturing the outermost edges of a quick calibration target.

Referring to FIG. 12, a method (or process) 700 is shown. The method 700 may automate a quick calibration technique for capturing the outermost edges of a quick calibration target. The method 700 generally comprises a step (or state) 702, a step (or state) 704, a decision step (or state) 706, a step (or state) 708, a step (or state) 710, a step (or state) 712, a step (or state) 714, a step (or state) 716, a step (or state) 718, and a step (or state) 720.

The step 702 may start the method 700. In the step 704, the user may set the quick calibration stand 328 at the fixed distance FD and fixed angle FA from the quick calibration target 330. The fixed distance FD and the fixed angle FA may be selected so that the checkerboard pattern of the quick calibration target 330 occupies the full field of view of the lens 160. After the quick calibration stand 328 has been set at the fixed distance FD and the fixed angle FA, the quick calibration technique 272 may be automated. Next, the method 700 may move to the decision step 706.

In the decision step 706, the input module 298 may determine whether the quick calibration automation has been initiated. In one example, the quick calibration automation may comprise computer readable instructions stored in the memory 150 that may be executed in response to an input received by the input module 298. In another example, the quick calibration automation may comprise computer readable instructions communicated from the calibration device 252 along with one of the configured warp tables 280*a*-280*m* in the signal TESTWARP (e.g., the quick calibration automation may be performed in response to a new one of the configured warp tables 280*a*-280*m* being received). If the quick calibration automation has not been initiated, then the method 700 may move to the step 708. In the step 708, the processor 102 may wait for the input from the input module 298. Next, the method 700 may return to the decision step 706. In the decision step 706, if the quick calibration automation has been initiated, then the method 700 may move to the step 710.

In the step 710, the processor 102 may capture the checkerboard image 370. Next, in the step 712, the intersection detection module 292 may detect the intersection points at the four outermost edges of the checkerboard image 370 (e.g., the topmost row of intersection points 390*aa*-390*an*, the leftmost column of intersection points 390*aa*-390*na*, the bottommost row of intersection points 390na-390nn and the rightmost column of intersection points 390an-390nn). In the step 712, the line fitting module 294 may determine the line fitting for the four outermost edges (e.g., the topmost edge line 422, the leftmost edge line 424, the bottommost edge line 426 and the rightmost edge line 428). Next, in the step 716, the distance summation module 296 may calculate the absolute distance in pixels of the intersection points 390aa-390nn at the outermost edges from the respective lines 422-428. Next, the processor 102 may communicate the results (e.g., the sum of the absolute distances) to the calibration device 252. Next, the method 700 may move to the step 720. In the step 720, the quick calibration automation iteration may be ended. Generally, the steps 710-720 may be the automated portion of the quick calibration technique 272 that may be performed by the processor 102 locally on each of the capture device 100a-100n during the mass production process. Next, the method 700 may move to the step 708 (e.g., a next one of the camera systems 100a-100n may be calibrated using the quick calibration technique 272).

The functions performed by the diagrams of FIGS. 1-12 may be implemented using one or more of a conventional general purpose processor, digital computer, microprocessor, microcontroller, RISC (reduced instruction set computer) processor, CISC (complex instruction set computer) processor, SIMD (single instruction multiple data) processor, signal processor, central processing unit (CPU), arithmetic logic unit (ALU), video digital signal processor (VDSP) and/or similar computational machines, programmed according to the teachings of the specification, as will be apparent to those skilled in the relevant art(s). Appropriate software, firmware, coding, routines, instructions, opcodes, microcode, and/or program modules may readily be prepared by skilled programmers based on the teachings of the disclosure, as will also be apparent to those skilled in the relevant art(s). The software is generally executed from a medium or several media by one or more of the processors of the machine implementation.

The invention may also be implemented by the preparation of ASICs (application specific integrated circuits), Platform ASICs, FPGAs (field programmable gate arrays), PLDs (programmable logic devices), CPLDs (complex programmable logic devices), sea-of-gates, RFICs (radio frequency integrated circuits), ASSPs (application specific standard products), one or more monolithic integrated circuits, one or more chips or die arranged as flip-chip modules and/or multi-chip modules or by interconnecting an appropriate network of conventional component circuits, as is described herein, modifications of which will be readily apparent to those skilled in the art(s).

The invention thus may also include a computer product which may be a storage medium or media and/or a transmission medium or media including instructions which may be used to program a machine to perform one or more processes or methods in accordance with the invention. Execution of instructions contained in the computer product by the machine, along with operations of surrounding circuitry, may transform input data into one or more files on the storage medium and/or one or more output signals representative of a physical object or substance, such as an audio and/or visual depiction. The storage medium may include, but is not limited to, any type of disk including floppy disk, hard drive, magnetic disk, optical disk, CD-ROM, DVD and magneto-optical disks and circuits such as ROMs (read-only memories), RAMs (random access memories), EPROMs (erasable programmable ROMs), EEPROMs (electrically erasable programmable ROMs), UVPROMs (ultra-violet erasable programmable ROMs), Flash memory, magnetic cards, optical cards, and/or any type of media suitable for storing electronic instructions.

The elements of the invention may form part or all of one or more devices, units, components, systems, machines and/or apparatuses. The devices may include, but are not limited to, servers, workstations, storage array controllers, storage systems, personal computers, laptop computers, notebook computers, palm computers, cloud servers, personal digital assistants, portable electronic devices, battery powered devices, set-top boxes, encoders, decoders, transcoders, compressors, decompressors, pre-processors, post-processors, transmitters, receivers, transceivers, cipher circuits, cellular telephones, digital cameras, positioning and/or navigation systems, medical equipment, heads-up displays, wireless devices, audio recording, audio storage and/or audio playback devices, video recording, video storage and/or video playback devices, game platforms, peripherals and/or multi-chip modules. Those skilled in the relevant art(s) would understand that the elements of the invention may be implemented in other types of devices to meet the criteria of a particular application.

The terms "may" and "generally" when used herein in conjunction with "is(are)" and verbs are meant to communicate the intention that the description is exemplary and believed to be broad enough to encompass both the specific examples presented in the disclosure as well as alternative examples that could be derived based on the disclosure. The terms "may" and "generally" as used herein should not be construed to necessarily imply the desirability or possibility of omitting a corresponding element.

The designations of various components, modules and/or circuits as "a"-"n", when used herein, disclose either a singular component, module and/or circuit or a plurality of such components, modules and/or circuits, with the "n" designation applied to mean any particular integer number. Different components, modules and/or circuits that each have instances (or occurrences) with designations of "a"-"n" may indicate that the different components, modules and/or circuits may have a matching number of instances or a different number of instances. The instance designated "a" may represent a first of a plurality of instances and the instance "n" may refer to a last of a plurality of instances, while not implying a particular number of instances.

While the invention has been particularly shown and described with reference to embodiments thereof, it will be understood by those skilled in the art that various changes in form and details may be made without departing from the scope of the invention.

The invention claimed is:

1. A system comprising:
a plurality of capture devices each comprising (i) a lens, (ii) a sensor and (iii) a warp table; and
a calibration device configured to (i) store a plurality of configured warp tables in a warp table pool, (ii) perform a full calibration technique for at least one of said plurality of capture devices to generate said configured warp tables, (iii) initiate a quick calibration for said plurality of capture devices and (iv) apply one of said configured warp tables to each of said plurality of capture devices as said warp table, wherein said calibration device applies one of said configured warp tables to each of said plurality of capture devices by:
 (a) selecting one of said configured warp tables from said warp table pool in response to said quick calibration, and (b) if said quick calibration fails (i) generating a new configured warp table for said warp table pool in response to said full calibration technique and (ii) selecting said new configured warp table.

2. The system according to claim 1, wherein said quick calibration comprises (a) applying one of said configured warp tables to one of said capture devices, (b) calculating a dewarp effect for said capture device using said one of said configured warp tables, (c) determining whether said dewarp effect passes a threshold, (d) selecting said one of said configured warp tables as said warp table for said capture device if said dewarp effect passes said threshold, (e) selecting a next one of said configured warp tables to said one of said capture devices and repeating (a)-(d) if said dewarp effect does not pass said threshold, and (f) repeating (a)-(e) for each of said capture devices.

3. The system according to claim 2, wherein said full calibration technique is performed for said capture devices to generate one of said configured warp tables only if none of said configured warp tables in said warp table pool are determined to pass said threshold.

4. The system according to claim 1, wherein each time said full calibration technique is performed said new configured warp table is added to said warp table pool to increase a total number of said configured warp tables stored in said warp table pool available for said quick calibration.

5. The system according to claim 1, wherein said quick calibration enables reusing said configured warp tables determined from a previous performance of said full calibration technique to reduce a number of times said full calibration technique is performed when calibrating each of said plurality of capture devices.

6. The system according to claim 1, wherein said full calibration technique is performed on one of said capture devices to add a first one of said configured warp tables to said warp table pool before said quick calibration is performed on said plurality of capture devices.

7. The system according to claim 1, wherein (i) said warp table is configured to apply a compensation to pixel data captured by said sensor and (ii) said compensation is implemented to correct inaccuracies to said pixel data caused by characteristics of said lens.

8. The system according to claim 1, wherein said quick calibration comprises an evaluation of a dewarp effect to determine whether said quick calibration fails.

9. The system according to claim 8, wherein said evaluation of said dewarp effect comprises (i) one of said capture devices capturing a checkerboard image, (ii) applying said one of said configured warp tables to said checkerboard image, (iii) a processor of said one of said capture devices (a) fetching intersection points of said checkerboard image, (b) calculating a fitted line for said intersection points and (c) calculating a sum of absolute distances of said intersection points from said fitted line and (vi) said calibration device comparing said sum of absolute distances to a predetermined threshold.

10. The system according to claim 9, wherein said intersection points comprise a location of said checkerboard image where light squares and dark squares of said checkerboard image meet along an edge of said checkerboard image.

11. The system according to claim 9, wherein said fitted line is a straight line calculated to pass through said intersection points.

12. The system according to claim 11, wherein said fitted line is calculated using a least squares approximation technique.

13. The system according to claim 9, wherein said sum of absolute distances of said intersection points from said fitted line is measured as a number of pixels.

14. The system according to claim 9, wherein said dewarp effect is perfect if said sum of absolute distances of said intersection points is zero pixels.

15. The system according to claim 9, wherein said fitted line is calculated for each of four outermost edges of said checkerboard image.

16. The system according to claim 9, wherein said capture devices is set at a distance and an angle from a quick calibration target board such that said checkerboard image fills in a full field of view of said lens.

17. The system according to claim 1, wherein said system is configured to implement a quick RGB-IR calibration verification for a mass production process of said plurality of capture devices.

18. The system according to claim 1, wherein said full calibration technique is performed using (i) a full calibration stand implemented for mounting said plurality of capture devices to capture a full calibration target used for said full calibration technique and (ii) a quick calibration stand implemented for mounting said plurality of capture devices to capture a quick calibration target used for said quick calibration.

19. The system according to claim 18, wherein (i) said full calibration stand is moved at least nine times during said full calibration technique in order to capture at least nine images of said full calibration target each at different specific distances and angles and (ii) said quick calibration stand is set up at a fixed distance and a fixed angle from said quick calibration target and not moved for said quick calibration.

20. The system according to claim 1, wherein said full calibration technique takes a longer amount of time to perform than said quick calibration.

* * * * *